(12) United States Patent
Iwasaki

(10) Patent No.: US 8,994,874 B2
(45) Date of Patent: Mar. 31, 2015

(54) IMAGE CAPTURE APPARATUS AND CONTROL METHOD THEREFOR

(71) Applicant: Canon Kabushiki Kaisha, Tokyo (JP)

(72) Inventor: Naoki Iwasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/107,508

(22) Filed: Dec. 16, 2013

(65) Prior Publication Data

US 2014/0176786 A1 Jun. 26, 2014

(30) Foreign Application Priority Data

Dec. 25, 2012 (JP) ................................. 2012-281753

(51) Int. Cl.
*H04N 5/232* (2006.01)
*G03B 13/36* (2006.01)

(52) U.S. Cl.
CPC ............ *H04N 5/23212* (2013.01); *G03B 13/36* (2013.01)
USPC .......................................... 348/349; 348/350

(58) Field of Classification Search
CPC ................................................ H04N 5/23212
USPC ................................................ 348/345–357
See application file for complete search history.

(56) References Cited

U.S. PATENT DOCUMENTS

| 2009/0190023 A1* | 7/2009 | Mise et al. ..................... 348/345 |
| 2012/0229628 A1* | 9/2012 | Ishiyama et al. .............. 348/135 |
| 2014/0253760 A1* | 9/2014 | Watanabe et al. ............. 348/239 |
| 2014/0300800 A1* | 10/2014 | Sasaki ........................... 348/347 |

FOREIGN PATENT DOCUMENTS

| JP | 2006-162724 A | 6/2006 |
| JP | 4185740 B | 11/2008 |
| JP | 4235422 B | 3/2009 |
| JP | 2012-004716 A | 1/2012 |

* cited by examiner

*Primary Examiner* — Tuan Ho
(74) *Attorney, Agent, or Firm* — Cowan, Liebowitz & Latman, P.C.

(57) ABSTRACT

Subject distances of a plurality of subject areas included in a captured image are computed based on a plurality of focus evaluation values indicating in-focus positions of a plurality of focus detection areas set in the captured image. Upon detection of a change in the captured image, the subject distances of the plurality of subject areas are re-computed by re-moving a focus lens. In this case, a driving range of the focus lens includes in-focus positions corresponding to previously-calculated subject distances and corresponds to the distribution of the previously-calculated subject distances.

9 Claims, 23 Drawing Sheets

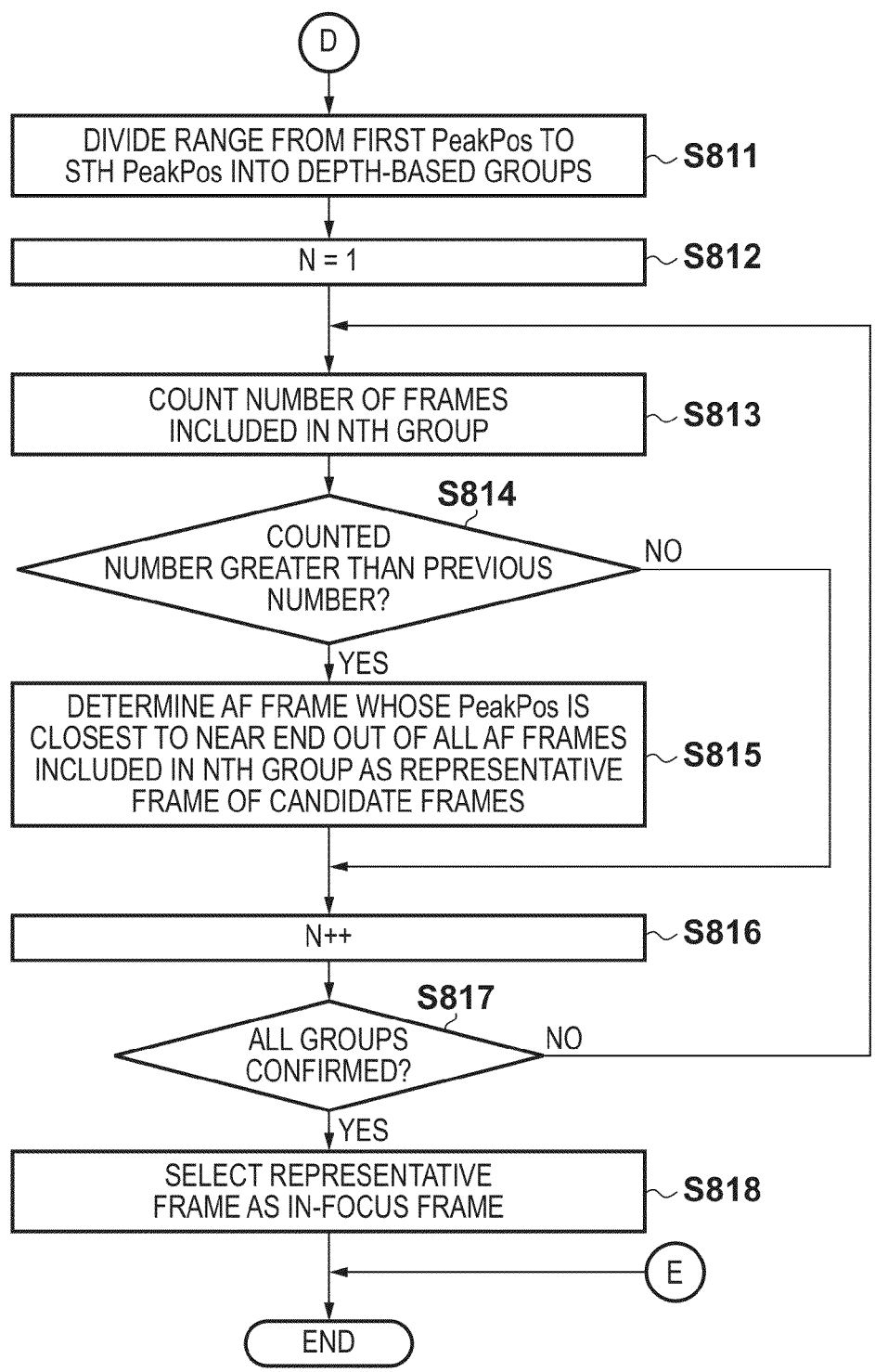

| × | 102 | × | × | × | × | × |
|---|---|---|---|---|---|---|
| × | × | × | × | × | × | × |
| 100 | 100 | 102 | × | × | × | × |
| 101 | 101 | 200 | 200 | 102 | 101 | 100 |
| 101 | 201 | 202 | 202 | 101 | 101 | 100 |
| 102 | 202 | 201 | 201 | 103 | 102 | 100 |
| 101 | 202 | 201 | 200 | 103 | 101 | 100 |
| 103 | 100 | 200 | 199 | 102 | 101 | 100 |
| 103 | 102 | 201 | 200 | 102 | 100 | 100 |

FIG. 10C

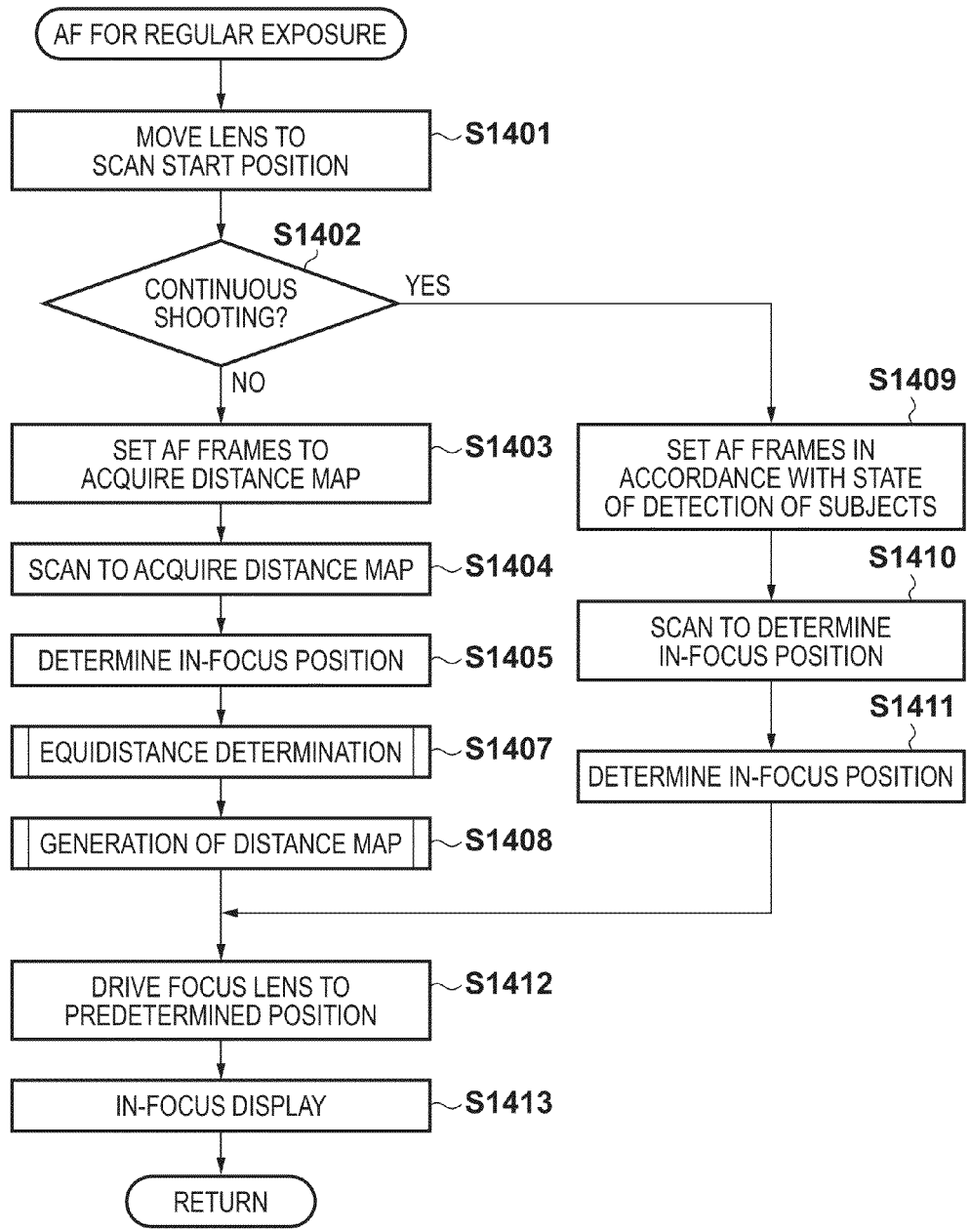

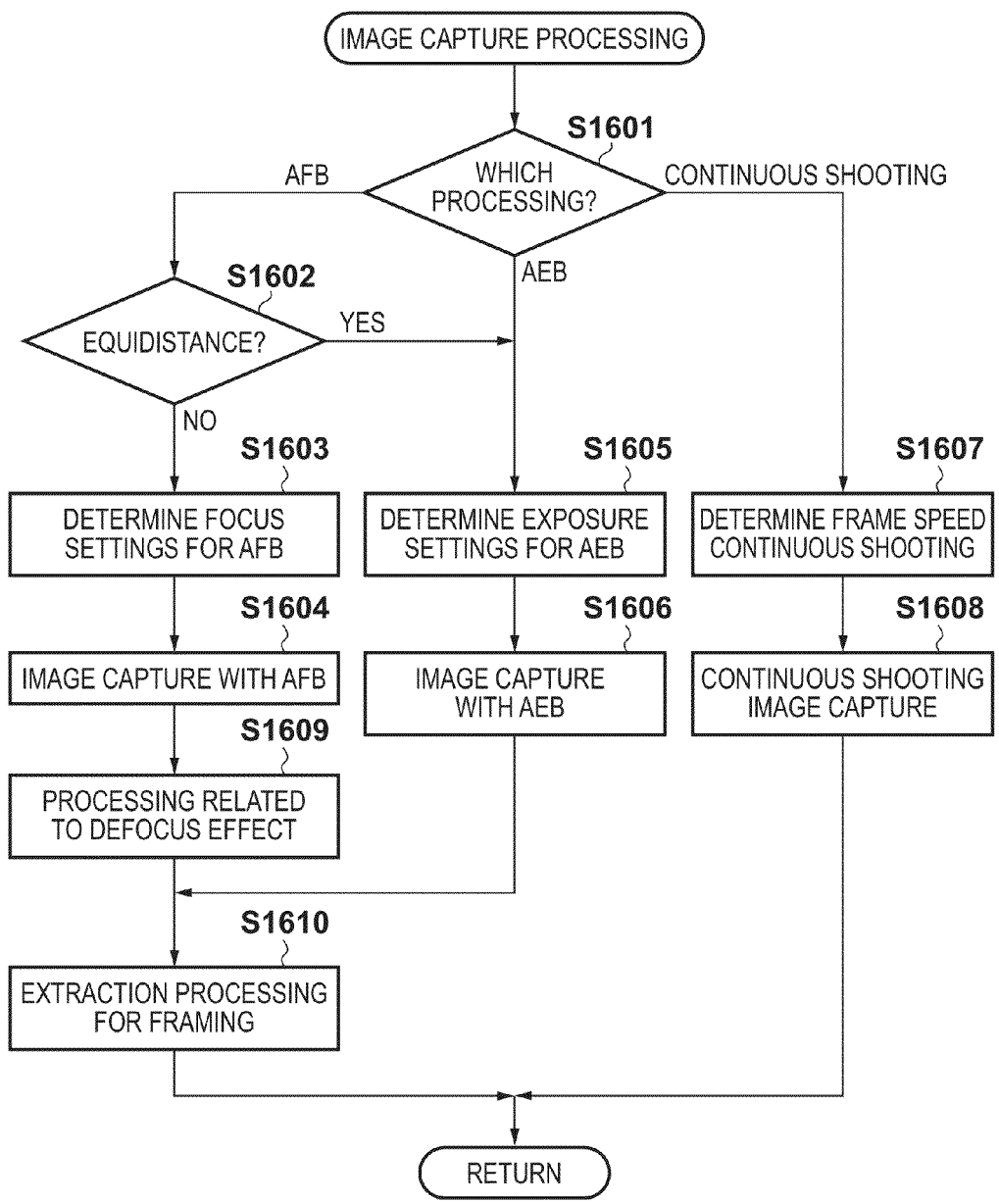

IMAGE CAPTURE APPARATUS AND CONTROL METHOD THEREFOR

BACKGROUND OF THE INVENTION

1. Field of the Invention

The present invention relates to an image capture apparatus and a control method therefor.

2. Description of the Related Art

Conventionally, electronic still cameras and video cameras use an automatic focus adjustment (autofocus or AF) method in which the position of a focus lens that maximizes high-frequency components of luminance signals acquired from an image sensor provided with a CCD (charge-coupled device) and the like is the in-focus position. This method is also referred to as a contrast detection method.

In order to search for the in-focus position (scanning), image capture is performed while driving the focus lens in a focus detection range (for example, from the near end to the far end). Then, evaluation values based on high-frequency components of luminance signals acquired from the image sensor (also referred to as focus evaluation values) are obtained and stored in correspondence with positions of the focus lens.

The focus evaluation values are not obtained for the entirety of an image, but for focus detection areas (hereinafter referred to as AF frames) that are set in the vicinity of the center of a screen or in the vicinity of detected subject areas. The position of the focus lens corresponding to the maximum focus evaluation value of the AF frames (hereinafter also referred to as a peak position) is determined as the in-focus position.

The resultant focus thus achieved at the time of AF is used to determine the in-focus position during image capture, and may further be used in determination associated with image capture processing and with image processing in the case where the distribution of distances in the screen is acquired by setting a plurality of AF frames.

According to the disclosure of Japanese Patent Laid-Open No. 2012-4716, distance information of each subject is acquired, an image is divided into areas of subjects located in the foreground and areas of subjects located in the background, and scene determination and image processing based on the result of scene determination are executed for each divided area. This document also discloses generation of distance information (range images) of subjects included in a captured screen based on the high-frequency components of an image acquired while moving the focus lens.

On the other hand, according to the disclosure of Japanese Patent Laid-Open No. 2006-162724, distances to subjects are measured in a plurality of AF frames, and if the subject distances satisfy predetermined conditions for starting focus bracketing, image capture operations corresponding to the satisfied conditions are executed.

However, if a scene with a large depth of field is divided into areas based on subject distances, the accuracy of area division is lowered due to a small difference among the subject distances acquired in the plurality of AF frames. Meanwhile, in the case of a planar subject with no practical difference in distance, even though the distance-based area division cannot be performed in reality, there is a possibility that erroneous area division is performed due to variation in the acquired subject distances.

The method described in Japanese Patent Laid-Open No. 2012-4716 does not evaluate the accuracy of area division based on information of subject distances, and therefore gives rise to the possibility that erroneous area division is performed in a scene with a small difference among subject distances.

On the other hand, while the method described in Japanese Patent Laid-Open No. 2006-162724 determines the in-focus distance for bracketing upon identification of a scene for which focus bracketing is effective, it does not perform area division based on subject distances, and therefore does not execute image processing and image capture processing for each area.

In the case where a scene has changed, distance information of subjects prior to the change of the scene should not be used as-is; however, Japanese Patent Laid-Open No. 2012-4716 and No. 2006-162724 do not take into consideration a change in the reliability of subject information caused by a change in a scene.

SUMMARY OF THE INVENTION

The present invention enables appropriate execution of image processing and image capture processing based on distance information of subjects by making use of the distance information in consideration of whether or not a scene has changed.

According to one aspect of the present invention, there is provided an image capture apparatus comprising: a focus detection unit that detects a plurality of focus evaluation values by moving a focus lens within a driving range, the plurality of focus evaluation values indicating in-focus positions of a plurality of focus detection areas; a distance computation unit that computes subject distances of a plurality of subject areas included in a captured image based on the plurality of focus evaluation values; and a change detection unit that detects whether or not the captured image has changed, wherein when the change detection unit has detected a change in the captured image, the distance computation unit re-computes the subject distances of the plurality of subject areas by re-moving the focus lens, the driving range of the focus lens for re-computing the subject distances of the plurality of subject areas is determined in accordance with distribution of previously-computed subject distances of the plurality of subject areas, and the driving range of the focus lens for re-computing the subject distances of the plurality of subject areas includes in-focus positions corresponding to the previously-computed subject distances of the plurality of subject areas.

According to another aspect of the present invention, there is provided an image capture apparatus comprising: a focus detection unit that detects a plurality of focus evaluation values by moving a focus lens within a driving range, the plurality of focus evaluation values indicating in-focus positions of a plurality of focus detection areas; a distance computation unit that computes subject distances of a plurality of subject areas included in a captured image based on the plurality of focus evaluation values; and a change detection unit that detects whether or not the captured image has changed, wherein when the change detection unit has detected a change in the captured image after moving the focus lens to compute the subject distances for the first time, the distance computation unit re-computes the subject distances of the plurality of subject areas by re-moving the focus lens, when the subject distances of the plurality of subject areas computed for the first time fall within a part of a range from a near end to a far end, the driving range of the focus lens for re-computing the subject distances of the plurality of subject areas is set to be smaller than the driving range of the focus lens used when computing the subject distances of the plurality of subject areas for the first time, and the driving range of the focus lens for re-computing the subject distances of the plurality of subject areas includes in-focus positions corresponding to the subject distances of the plurality of subject areas computed for the first time.

According to still another aspect of the present invention, there is provided a control method for an image capture apparatus comprising: a focus detection step of detecting a plurality of focus evaluation values by moving a focus lens within a driving range, the plurality of focus evaluation values indicating in-focus positions of a plurality of focus detection areas; a distance computation step of computing subject distances of a plurality of subject areas included in a captured image based on the plurality of focus evaluation values; and a change detection step of detecting whether or not the captured image has changed, wherein when a change in the captured image has been detected in the change detection step, the distance computation step re-computes the subject distances of the plurality of subject areas by re-moving the focus lens, the driving range of the focus lens for re-computing the subject distances of the plurality of subject areas is determined in accordance with distribution of previously-computed subject distances of the plurality of subject areas, and the driving range of the focus lens for re-computing the subject distances of the plurality of subject areas includes in-focus positions corresponding to the previously-computed subject distances of the plurality of subject areas.

According to yet another aspect of the present invention, there is provided a control method for an image capture apparatus comprising: a focus detection step of detecting a plurality of focus evaluation values by moving a focus lens within a driving range, the plurality of focus evaluation values indicating in-focus positions of a plurality of focus detection areas; a distance computation step of computing subject distances of a plurality of subject areas included in a captured image based on the plurality of focus evaluation values; and a change detection step of detecting whether or not the captured image has changed, wherein when a change in the captured image has been detected in the change detection step after moving the focus lens to compute the subject distances for the first time, the distance computation step re-computes the subject distances of the plurality of subject areas by re-moving the focus lens, when the subject distances of the plurality of subject areas computed for the first time fall within a part of a range from a near end to a far end, the driving range of the focus lens for re-computing the subject distances of the plurality of subject areas is set to be smaller than the driving range of the focus lens used when computing the subject distances of the plurality of subject areas for the first time, and the driving range of the focus lens for re-computing the subject distances of the plurality of subject areas includes in-focus positions corresponding to the subject distances of the plurality of subject areas computed for the first time.

Further features of the present invention will become apparent from the following description of exemplary embodiments with reference to the attached drawings.

BRIEF DESCRIPTION OF THE DRAWINGS

FIGS. 8A and 8B are flowcharts of AF frame selection processing for the case where subjects have been detected in the embodiment.

FIGS. 10A to 10C are schematic diagrams for describing an example of AF frame selection for the case where subjects have not been detected in the present embodiment.

FIG. 14 is a flowchart of an AF operation for regular exposure according to the embodiment.

FIG. 16 is a flowchart of image capture processing according to the embodiment.

DESCRIPTION OF THE EMBODIMENTS

Preferred embodiments of the present invention will now be described in detail in accordance with the accompanying drawings.

<Block Diagram of Digital Camera>

Figure 1:
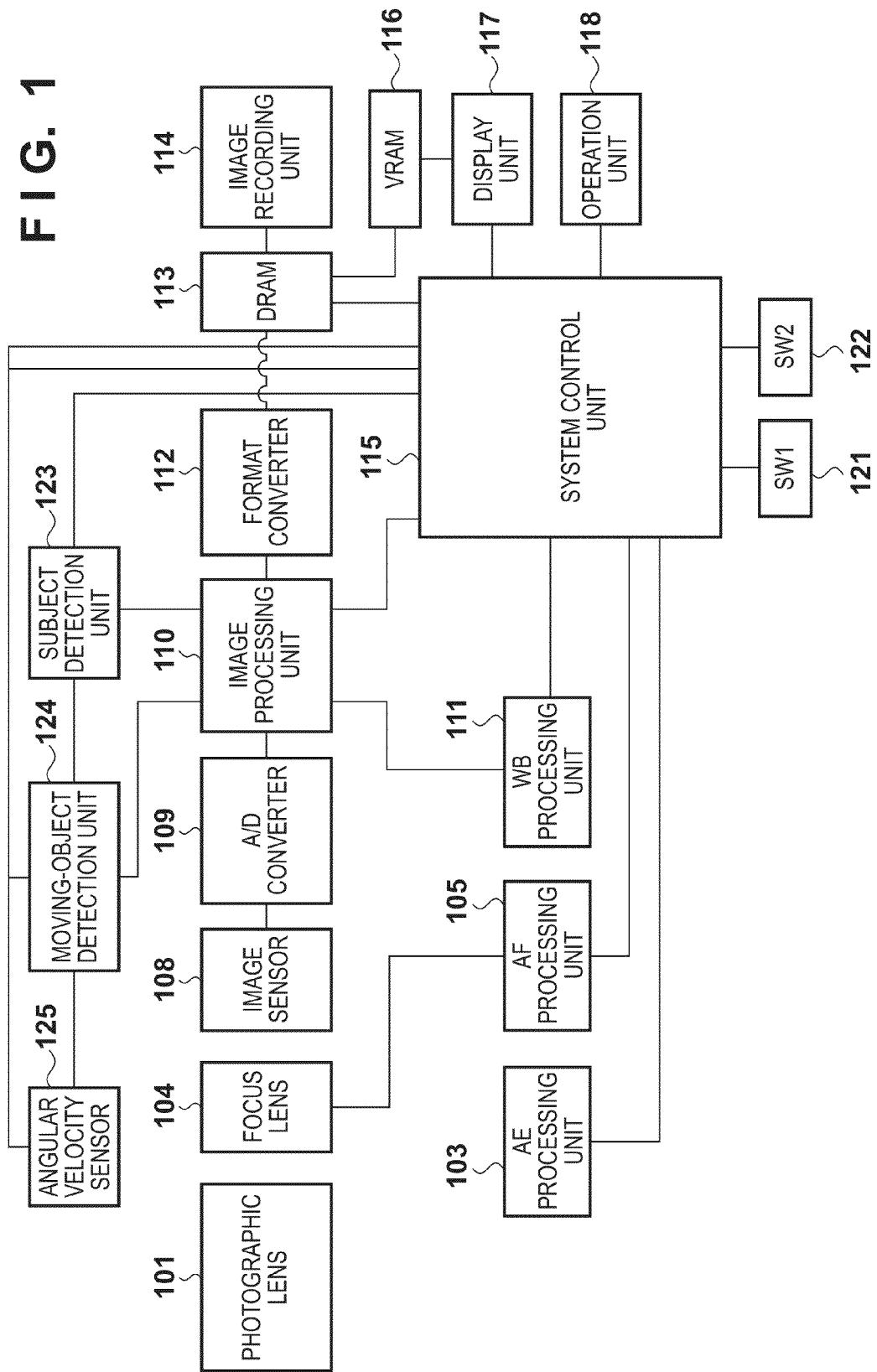
FIG. 1 is a block diagram showing an example of a functional configuration of a digital still camera, which is one example of an image capture apparatus according to an embodiment.

FIG. 1 is a block diagram showing an example of a functional configuration of a digital (still) camera, which is one example of an image capture apparatus according to an embodiment of the present invention.

A photographic lens 101 has, for example, a zoom mechanism. An AE processing unit 103 measures the luminance of a subject and determines exposure conditions (shutter speed, aperture size, photographing sensitivity, and the like). A focus lens 104 is movable in the direction of the optical axis under control by an AF processing unit 105, and adjusts the distance to the subject that is focused by the photographic lens 101 on an imaging surface of an image sensor 108. The AF processing unit 105 also drives the zoom mechanism of the photographic lens 101.

The image sensor 108 is a photoelectric conversion element, such as a CCD image sensor and a CMOS image sensor, and converts a subject image, which is reflected light from the subject that is formed on the imaging surface by the photographic lens 101 and the focus lens 104, into electrical signals on a per-pixel basis. An A/D converter 109 converts signals output from the image sensor 108 into digital signals. The A/D converter 109 includes a CDS circuit for removing signal noise, and a nonlinear amplifier circuit that operates prior to the A/D conversion. An image processing unit 110 applies various types of image processing, such as color interpolation processing, gamma conversion processing, resize processing and encoding processing, to digital image signals that have been A/D converted. The image processing unit 110 also decodes encoded image data read from an image recording unit 114.

A format converter 112 converts a signal format, for example, from an RGB format into a YUV format. A DRAM 113 is a built-in memory and used as a high-speed buffer for temporarily storing images, or as a working memory for compression and decompression of images. The image recording unit 114 includes a recording medium, such as a semiconductor memory card, and an interface for reading/writing data from/to the recording medium.

A system control unit 115 is a programmable processor such as a CPU and an MPU, and realizes the operations of the digital camera, including later-described AF processing, by controlling various components through execution of programs pre-stored in a non-volatile storage device such as a ROM. A VRAM 116 is a memory used for display, and a display unit 117 displays data that is stored in the VRAM 116 for display purpose. The display unit 117 may be, for example, a flat-panel display such as a liquid crystal display and an organic EL display. For example, the display unit 117 displays: images captured by the image sensor 108; images read from the image recording unit 114; assistance for user operations; the statuses of the camera; and marks indicating a captured screen and focus detection areas during image capture.

An operation unit 118 is a collective term for a group of input devices via which a user inputs instructions and settings to the digital camera. For example, the group of input devices includes: a shutter button; buttons for various types of settings related to image capture functions and image playback (e.g., a menu button, direction buttons, and an enter button); a zoom lever for instructing the photographic lens 101 to execute a zoom operation; and a switch for switching between an image capture mode and a playback mode. The operation unit 118 may further include: a touch screen attached to the display unit 117; and an input device that utilizes such technology as voice recognition and eye-tracking and therefore is not provided with buttons and switches.

A switch 121 (hereinafter referred to as SW1) is used to issue instructions for starting image capture standby operations, such as automatic focus adjustment (AF) processing and automatic exposure control (AE). A switch 122 (hereinafter referred to as SW2) is used to issue instructions for capturing images for recording purpose. In the present embodiment, SW2 is turned ON while SW1 is in the ON state. For example, SW1 is turned on by pressing the shutter button halfway down, and SW2 is turned on by pressing the shutter button all the way down.

A subject detection unit 123 detects areas of subjects having predetermined features using image signals processed by the image processing unit 110. A subject is typically a human face, but may be any object that can be detected from image signals. A subject is not limited to being detected by a particular method, and may be detected using any known method as appropriate, such as a method utilizing pattern matching. The subject detection unit 123 outputs, to the system control unit 115, information of each subject area (position, size, reliability, and the like) as a result of detection.

A moving-object detection unit 124 detects whether or not subjects and the background in a screen are moving, and outputs a result of detection (moving-object information) to the system control unit 115. The moving-object detection unit 124 detects moving-object information of subjects and the background (positions, ranges, movement amounts, and directions of moving-object areas) based on, for example, differential information of a plurality of images captured at different timings. An angular velocity sensor 125 detects the movement of the digital camera itself, and outputs camera movement information to the system control unit 115.

<Operations of Digital Camera>

Figure 2:
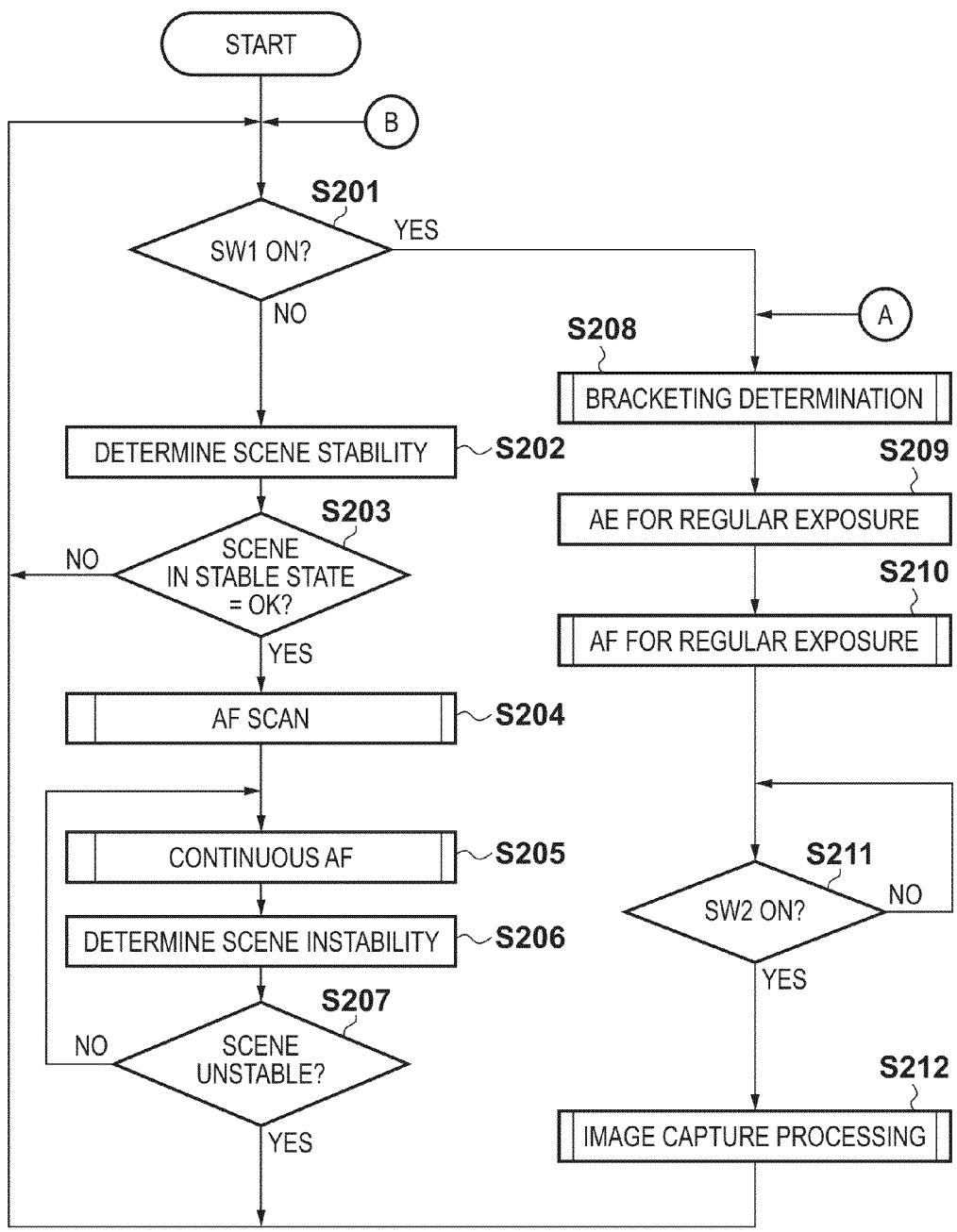
FIG. 2 is a flowchart of an overall operation of a digital camera according to the embodiment.

With reference to a flowchart of FIG. 2, the following describes the overall operations of the digital camera according to the present embodiment.

First, in step S201, the system control unit 115 determines the state (ON/OFF) of SW1 used to issue an instruction for image capture preparation, and proceeds to steps S208 and S202 if SW1 is in the ON state and the OFF state, respectively.

In step S202, the system control unit 115 determines whether or not a captured scene is in a stable state (scene stability determination). It should be noted that the stable state of the captured scene denotes the state where the movement of subjects to be captured and the change in the state (orientation) of the digital camera are kept below corresponding thresholds, that is to say, the state suitable for image capture. The system control unit 115 can determine whether or not the captured scene is in the stable state based on, for example, a movement amount of the digital camera detected by the angular velocity sensor 125 and on the amount of change in the luminance of subjects detected by the AE processing unit 103.

In step S203, the system control unit 115 checks whether or not the captured scene was determined to be in the stable state in step S202; it proceeds to step S204 if the captured scene was determined to be in the stable state, and returns to step S201 if the captured scene was not determined to be in the stable state.

In step S204, the system control unit 115 executes AF scan processing in accordance with a later-described procedure so as to detect focus points and distance information of subjects included in the captured scene. Next, in step S205, the system control unit 115 executes continuous AF processing in accordance with a later-described procedure.

In step S206, the system control unit 115 determines whether or not the captured scene is in an unstable state (scene instability determination). It should be noted that the unstable state of the captured scene denotes the state where the subjects to be captured and the digital camera are unstable, that is to say, the state unsuitable for image capture. The system control unit 115 can determine whether or not the captured scene is in the unstable state based on, for example, a movement amount of the digital camera detected by the angular velocity sensor 125 and on the amount of change in the luminance of subjects detected by the AE processing unit 103. A specific description will be provided later with reference to FIG. 18.

In step S207, the system control unit 115 checks whether or not the captured scene was determined to be in the unstable state in step S206; it proceeds to step S201 if the captured scene was determined to be in the unstable state, and to step S205 if the captured scene was not determined to be in the unstable state.

If SW1 is ON in step S201, the system control unit 115 determines, in step S208, the optimal control (AF bracketing, AE bracketing, and continuous shooting) to be executed when capturing images for recording purpose (bracketing determination) in accordance with a later-described procedure.

In step S209, the system control unit 115 causes the AE processing unit 103 to execute AE (automatic exposure control) processing for regular exposure (to capture images for recording purpose).

In step S210, the system control unit 115 executes AF (automatic focus detection or automatic focus adjustment) processing for regular exposure in accordance with a later-described procedure.

In step S211, the system control unit 115 determines the state (ON/OFF) of SW2, and proceeds to step S212 and waits in step S211 if SW2 is in the ON state and the OFF state, respectively.

In step S212, the system control unit 115 executes image capture processing in accordance with a later-described procedure.

<AF Scan>

Figure 3:
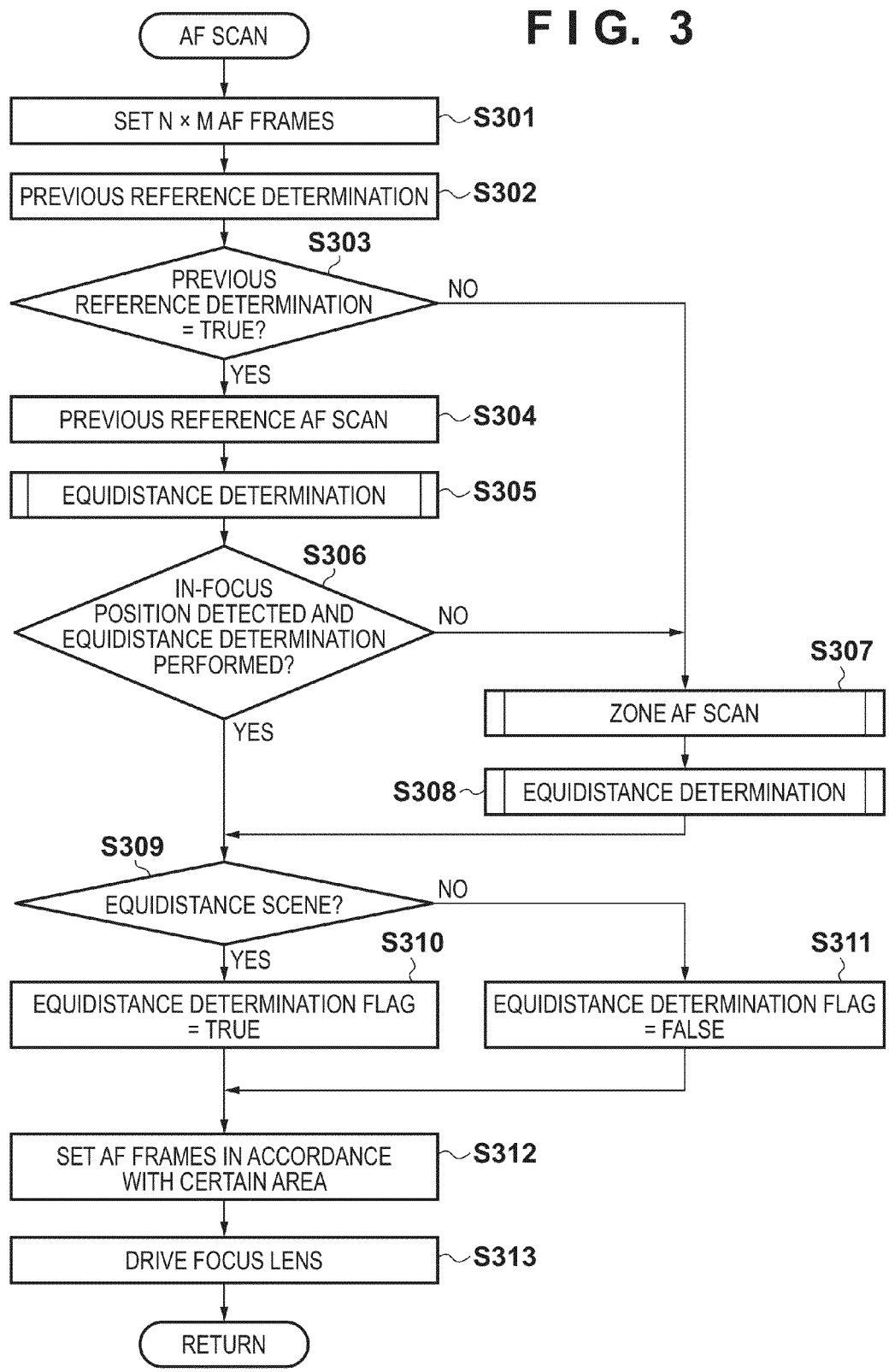
FIG. 3 is a flowchart of AF scan processing according to the embodiment.

FIG. 3 is a flowchart of AF scan processing executed in step S204 of FIG. 2. More specifically, this AF scan processing involves acquisition of distance information, which is used to determine whether or not a captured scene includes subjects with different distances (hereinafter referred to as equidistance determination), and search for the in-focus position.

Figure 4:
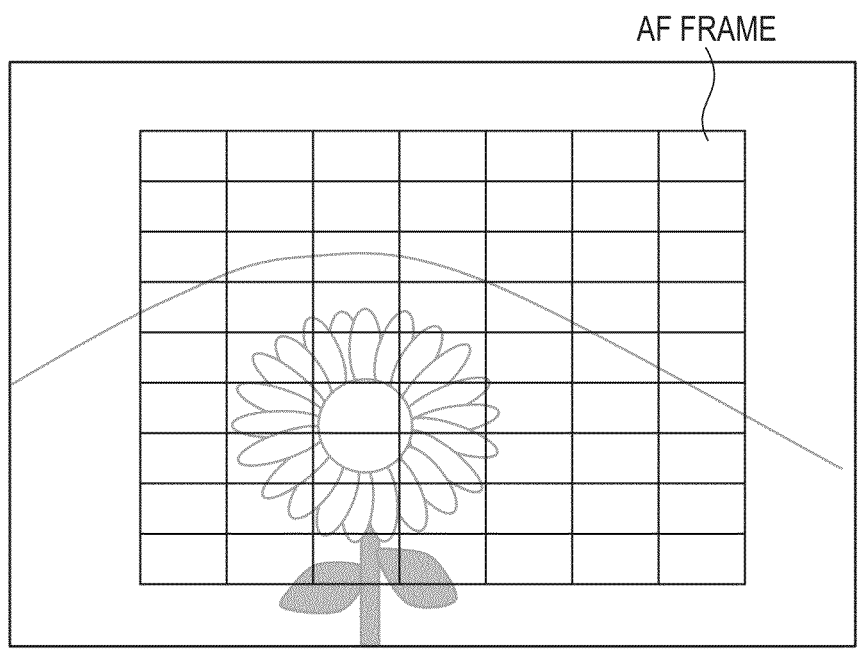
FIG. 4 shows an example of AF frames set in the AF scan processing according to the embodiment.

First, in step S301, the system control unit 115 sets N×M focus detection areas (AF frames) in a screen, N and M being along the vertical direction and the horizontal direction, respectively. FIG. 4 shows an example of AF frames set under the condition that N=7 and M=9. It should be noted that the range of set AF frames is not limited to the one shown in FIG. 4. For example, the AF frames may be set in consideration of subject areas detected by the subject detection unit 123.

In step S302, the system control unit 115 determines whether or not the captured scene shows little change from the previous determination (previous reference determination). The system control unit 115 obtains TRUE as a result of determination if the captured scene is determined to show little change from the previous determination, and obtains FALSE as a result of determination otherwise. The system control unit 115 also sets an AF scan range in accordance with a result of the previous reference determination processing. Specifics of the previous reference determination will be described later with reference to FIG. 20.

In step S303, the system control unit 115 proceeds to steps S304 and S307 if the result of the previous reference determination in step S302 is TRUE and FALSE, respectively. In step S304, the system control unit 115 executes previous reference AF scan, in which a specific range set in the previous reference determination is scanned instead of the entire scannable range.

In step S305, the system control unit 115 executes equidistance determination in accordance with a later-described procedure of FIG. 11. The equidistance determination is processing for determining, based on the distribution of peak positions in AF frames, whether or not the captured scene is an equidistance scene in which there is no difference among distances of subjects in the screen. The result of the equidistance determination is one of (1) the equidistance determination was able to be performed and the captured scene is determined as the equidistance scene, (2) the equidistance determination was able to be performed but the captured scene was not determined as the equidistance scene, and (3) the equidistance determination was not able to be performed.

In step S306, the system control unit 115 proceeds to step S309 if it determines that the in-focus position was able to be detected in the previous reference AF scan in step S304 and the equidistance determination was able to be performed in step S305, and proceeds to step S307 otherwise.

In step S307, the system control unit 115 performs zone AF scan in accordance with a later-described procedure. Zone AF scan is processing for performing AF scan zone-by-zone in the case where a range from the near end to the far end is divided into a plurality of ranges (zones).

In step S308, the system control unit 115 performs equidistance determination similar to that of step S305.

The system control unit 115 determines in step S309 whether or not the captured scene was determined as the equidistance scene in the equidistance determination of step S305 or S308; it sets an equidistance determination flag to TRUE in step S310 if the captured scene was determined as the equidistance scene, and sets the equidistance determination flag to FALSE in step S311 otherwise.

In step S312, if subject areas have been detected by the subject detection unit 123, the system control unit 115 sets AF frames in accordance with the detected subject areas. If subject areas have not been detected by the subject detection unit 123 but were able to be identified in the zone AF scan in step S307, the system control unit 115 sets AF frames in accordance with the subject areas identified in the zone AF scan. If subject areas have not been detected by the subject detection unit 123 and were not able to be identified in the zone AF scan in step S307, the system control unit 115 sets AF frames in accordance with a predetermined region. It should be noted that an area that is likely to include a subject, such as a central area of the screen, is set as the predetermined area.

If the in-focus position was found in the zone AF scan in step S307, the system control unit 115 causes the AF processing unit 105 to drive the focus lens 104 to the in-focus position in step S313. On the other hand, if the in-focus position was not found in the zone AF scan, the focus lens 104 is driven to a preset fixed point (a position with a high probability of existence of a subject).

<Zone AF Scan>

Figure 5:
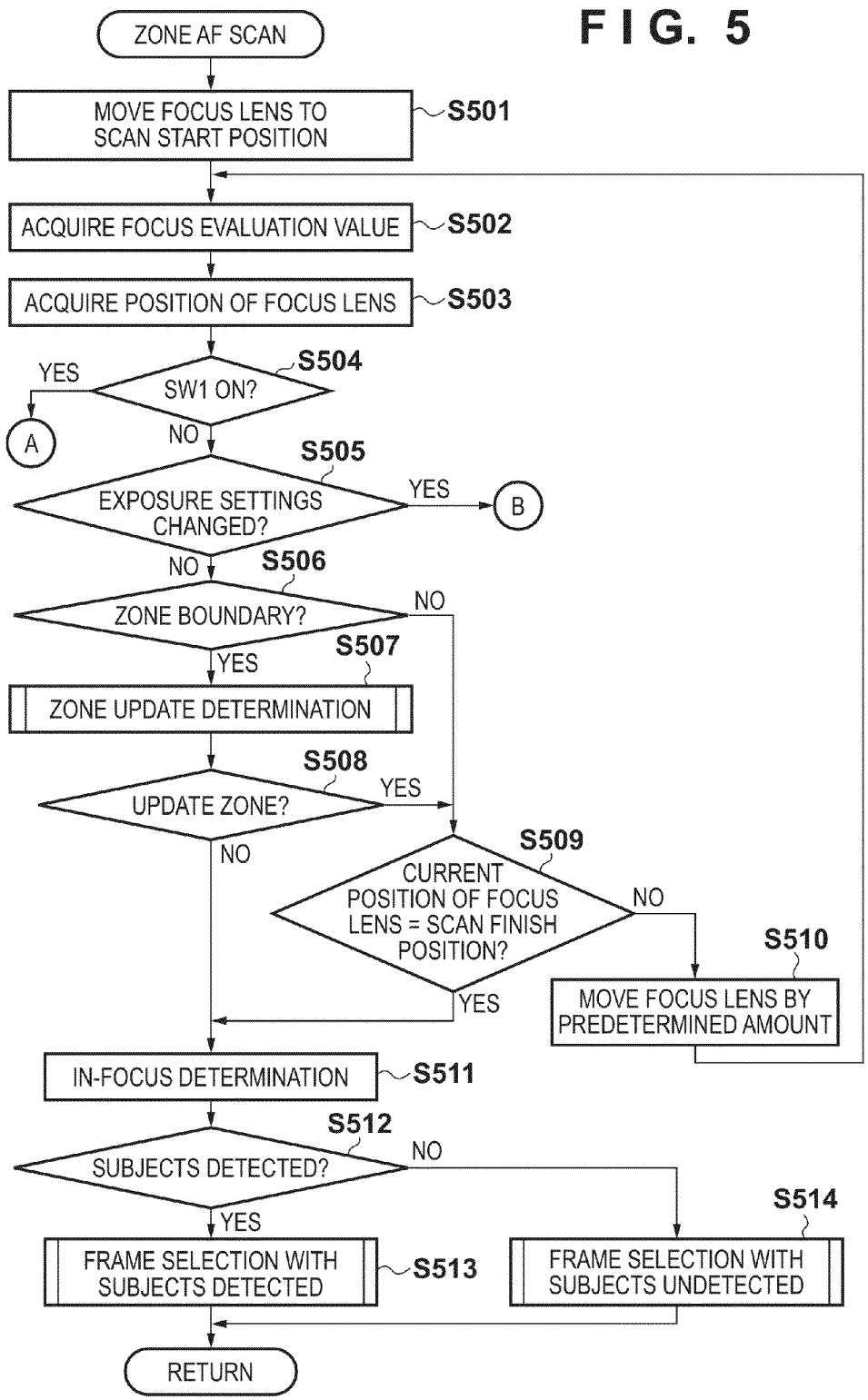
FIG. 5 is a flowchart of zone AF scan processing according to the embodiment.

FIG. 5 is a flowchart of zone AF scan processing executed in step S307 of FIG. 3. Zones denote ranges obtained by dividing a distance range in which focus can be achieved (from the near end to the far end) into a plurality of ranges (zones).

First, in step S501, the system control unit 115 moves the focus lens 104 to a scan start position. It will be assumed that the scan start position corresponds to, for example, the far end.

In step S502, the A/D converter 109 converts analog image signals read from the image sensor 108 into digital signals, the image processing unit 110 extracts, from the output digital signals, high-frequency components of luminance signals as a focus evaluation value, and the system control unit 115 stores the focus evaluation value.

In step S503, the system control unit 115 acquires the current position of the focus lens 104 from the AF processing unit 105, and stores the same in correspondence with the focus evaluation value.

In step S504, the system control unit 115 determines the state (ON/OFF) of SW1 used to issue an instruction for image capture preparation; it completes the present processing and proceeds to step S208 of FIG. 2 if SW1 is in the ON state, and proceeds to step S505 if SW1 is in the OFF state.

In step S505, the system control unit 115 determines whether or not exposure settings have changed from the start of the scan; it proceeds to step S201 of FIG. 2 if the exposure settings have changed, and to step S506 if the exposure settings have not changed.

In step S506, the system control unit 115 checks whether or not the focus lens 104 is located at a preset zone boundary position; it proceeds to step S507 if the focus lens 104 is located at the preset zone boundary position, and to step S509 otherwise.

In step S507, the system control unit 115 performs zone update determination in accordance with a later-described procedure of FIG. 6. Zone update determination is determination as to whether or not completion of AF scan in a certain zone should be continuously followed by the execution of AF scan in an adjacent zone.

In step S508, the system control unit 115 proceeds to step S509 if it has determined in the zone update determination of step S507 that a zone is to be updated, that is to say, AF scan is to be continued in a zone adjacent in the direction toward a scan finish position. On the other hand, the system control unit 115 proceeds to step S511 if it has determined that a zone is not to be updated.

In step S509, the system control unit 115 causes the AF processing unit 105 to check whether or not the current position of the focus lens 104 is equal to the scan finish position (more specifically, the position corresponding to the near end); it proceeds to step S511 if they are equal, and to step S510 otherwise.

In step S510, the system control unit 115 causes the AF processing unit 105 to move the focus lens 104 by a predetermined amount toward the scan finish position, and then returns to step S502.

In step S511, the system control unit 115 determines one of the following three determinations as a result of scan in each AF frame.

○ determination (in-focus determination): the contrast of subjects is sufficient, and subjects exist in the scanned distance range.

X determination: the contrast of subjects is insufficient, or subjects exist outside the scanned distance range.

Δ determination: subjects are closer to the scan finish position (more specifically, closer to the near end) than the scanned distance range is.

It should be noted that the in-focus determination can be performed using known methods, such as methods described in Japanese Patents No. 4235422 and No. 4185740, and therefore a description thereof is omitted.

In step S512, the system control unit 115 checks whether or not subject areas have been detected by the subject detection unit 123; it proceeds to step S513 if the subject areas have been detected, and to step S514 if the subject areas have not been detected.

In step S513, the system control unit 115 performs AF frame selection for the case where subjects have been detected in accordance with later-described processing of FIGS. 8A and 8B.

In step S514, the system control unit 115 performs AF frame selection for the case where subjects have not been detected in accordance with later-described processing of FIG. 9.

<Zone Update Determination>

Figure 6:
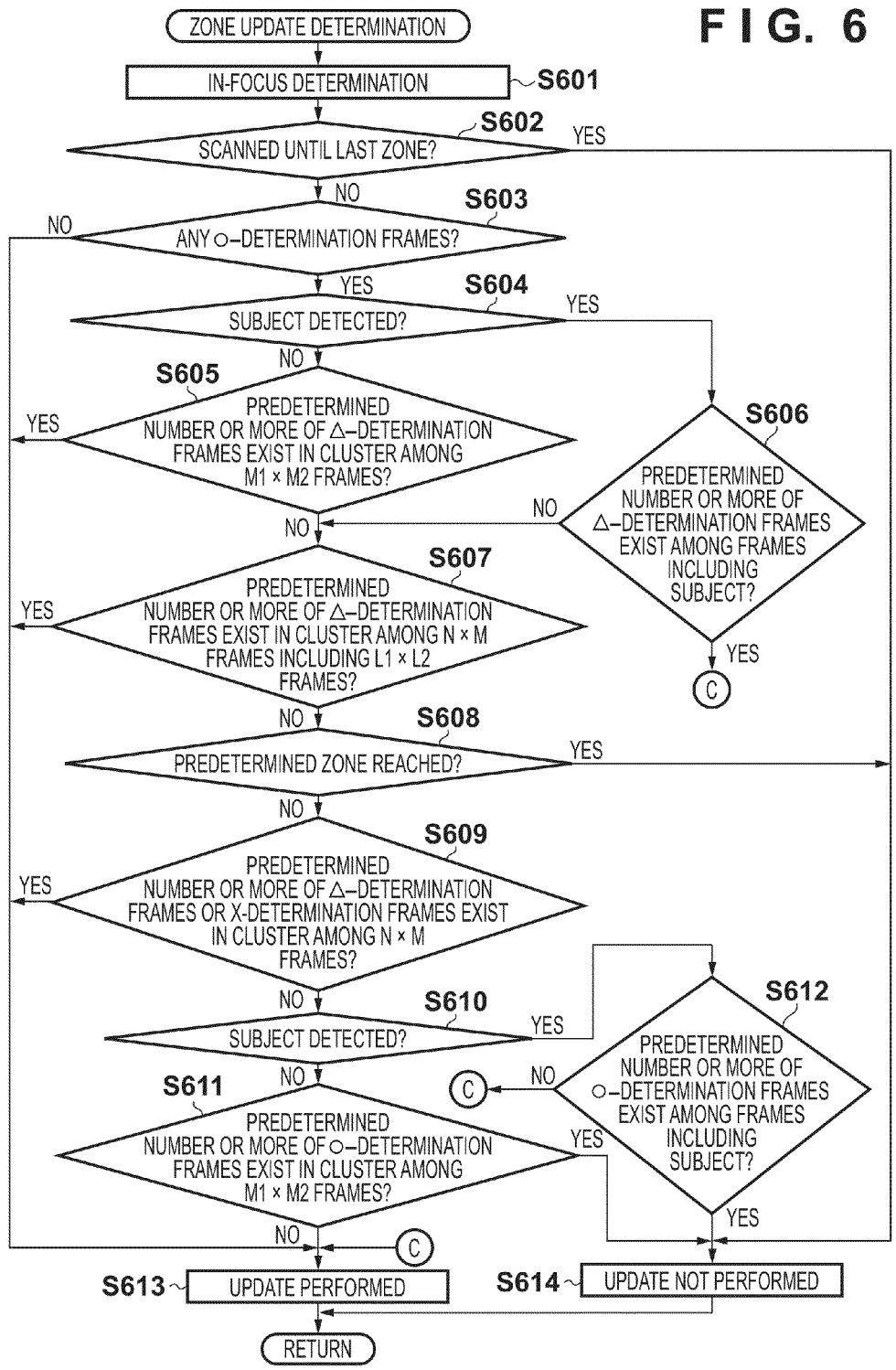
FIG. 6 is a flowchart of zone update determination processing according to the embodiment.

FIG. 6 is a flowchart of the zone update determination performed in step S507 of FIG. 5. In the zone update determination, whether or not any subject is likely to exist further ahead in the scan direction, that is to say, whether or not to continue AF scan, is determined. FIGS. 7A to 7G are drawings for describing an example of the zone update determination of FIG. 6, illustrating N×M AF frames set under the condition that N=7 and M=9, similarly to FIG. 4 (9 AF frames in the horizontal direction and 7 AF frames in the vertical direction).

Figure 7A:
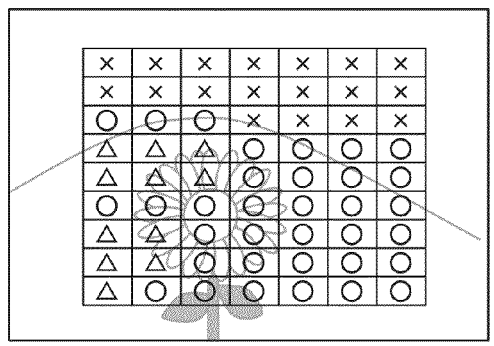
FIGS. 7A to 7G are diagrams for describing examples of the zone update determination processing according to the embodiment.
Figure 7B:
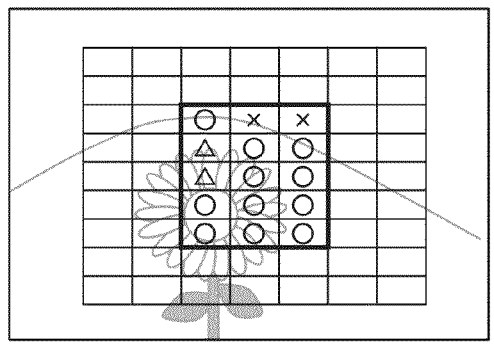

First, in step S601, the system control unit 115 performs in-focus determination similar to the one performed in step S511 in all AF frames that have been set. It will be assumed that the result of the in-focus determination for each AF frame is as shown in FIG. 7A.

In step S602, the system control unit 115 checks whether or not AF scan has been performed until the last zone; it proceeds to step S614 if AF scan has been performed until the last zone, and to step S603 otherwise.

In step S603, the system control unit 115 checks whether or not there is any AF frame for which ○ determination has been made (○-determination frame); it proceeds to step S604 if there is any ○-determination frame, and to step S613 otherwise.

In step S604, the system control unit 115 checks whether or not a subject area has been detected by the subject detection unit 123; it proceeds to step S606 if a subject area has been detected, and to step S605 otherwise.

In step S605, the system control unit 115 checks whether or not a predetermined number or more of AF frames for which Δ determination has been made (Δ-determination frames) are located "in a cluster" among M1×M2 frames at the central portion of the screen; it proceeds to step S613 if the Δ-determination frames are thus located "in a cluster", and to step S607 otherwise. For example, provided that M1=3, M2=5, and the predetermined number is 5, there are two adjacent Δ-determination frames among the frames at the central portion indicated by a thick frame in FIG. 7B, that is to say, a cluster of the predetermined number or more of Δ-determination frames does not exist. It should be noted that a "cluster" refers to an area consisting only of AF frames of the same determination result.

Figure 7C:
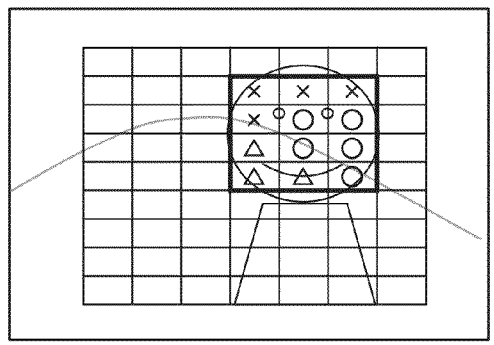
Figure 7D:
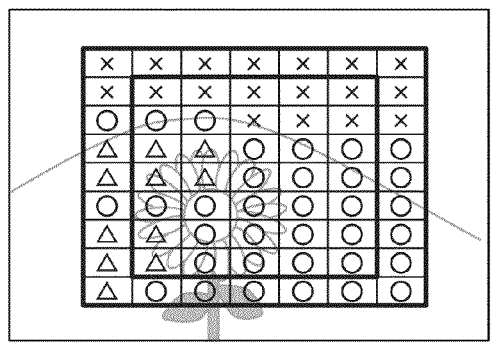

In step S606, the system control unit 115 checks whether or not a predetermined number or more of Δ-determination frames are included among AF frames including the detected subject area; it proceeds to step S613 if the predetermined number or more of Δ-determination frames are included, and to step S607 if the predetermined number or more of Δ-determination frames are not included. It will be assumed that an AF frame including a subject area denotes an AF frame in which the subject area accounts for a predetermined percentage or more of the AF frame. Referring to FIG. 7C that shows an example in which a facial area of a person has been detected as a subject area, provided that the predetermined number is five, a cluster of three Δ-determination frames exists among AF frames including the facial area (AF frames in a thick frame), that is to say, a cluster of the predetermined number or more of Δ-determination frames does not exist thereamong.

In step S607, the system control unit 115 checks whether or not there is any possibility that a predetermined number or more of Δ-determination frames exist "in a cluster" among N×M AF frames including at least one of L1×L2 frames at the center. The system control unit 115 proceeds to step S613 if there is any position that achieves that possibility, and to step S608 if there is no such position. For example, in FIG. 7D, it is assumed that L1=5, L2=7 (the inner thick frame), and the predetermined number is 10. Even if the N×M frames are moved so as to include at least one of the AF frames in the inner thick frame, a maximum of six Δ-determination frames exist in a cluster among the N×M frames, that is to say, a cluster of the predetermined number or more of Δ-determination frames does not exist.

In step S608, the system control unit 115 checks whether or not the scan has been completed until a predetermined zone that has been preset; it proceeds to step S614 if the scan has been completed, and to step S609 if the scan has not been completed. A predetermined zone denotes a zone in which Δ determination is assumed to be made for AF frames corresponding to the position of a subject in the screen in the case where the subject exists at the end of a scannable range in the AF scan direction (the near end in the present embodiment). If this zone is reached without detection of a cluster of Δ-determination frames (subject area), it is considered that a subject does not exist in zones along the direction in which the scan is to be performed from that point.

Figure 7E:
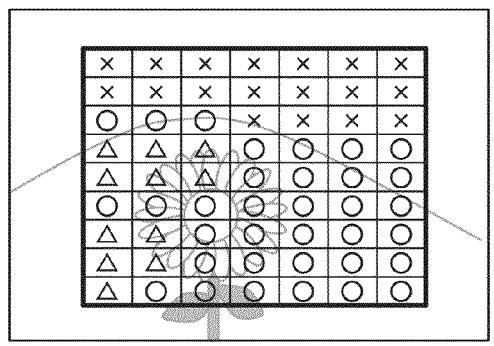

In step S609, the system control unit 115 checks whether or not a predetermined number or more of Δ-determination frames or X-determination frames exist in a cluster among N×M frames; it proceeds to step S613 if they exist, and to step S614 otherwise. For example, referring to FIG. 7E, provided that the predetermined number is 20, a maximum of 18 Δ-determination frames or X-determination frames exist in a cluster, that is to say, a cluster of the predetermined number or more of Δ-determination frames or X-determination frames does not exist.

In step S610, the system control unit 115 checks whether or not a subject area has been detected by the subject detection unit 123; it proceeds to step S612 if the subject area has been detected, and to step S611 if the subject area has not been detected.

Figure 7F:
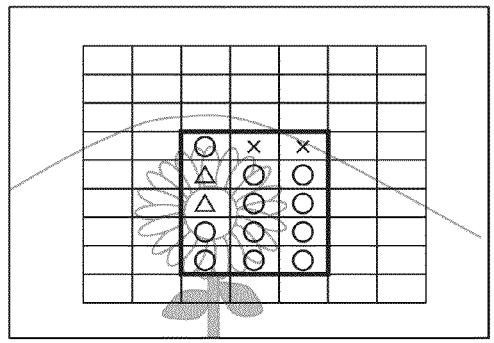

In step S611, the system control unit 115 checks whether or not a predetermined number or more of ○-determination frames exist in a cluster among M1×M2 frames at the center; it proceeds to step S613 if they exist in a cluster, and to step S614 otherwise. For example, referring to FIG. 7F, provided that the predetermined number is ten, as ten ○-determination frames exist in a cluster among M1×M2 frames at the center indicated by a thick frame, a cluster of the predetermined number or more of ○-determination frames exists.

Figure 7G:
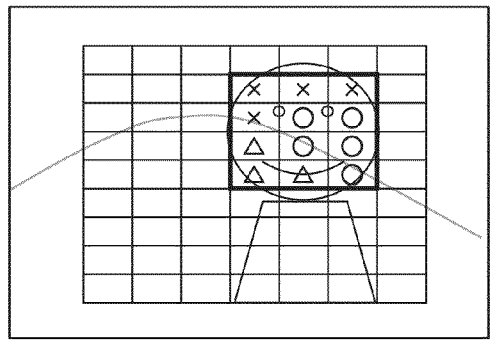

In step S612, the system control unit 115 checks whether or not a predetermined number or more of ○-determination frames are included among AF frames including the subject area; it proceeds to step S613 if they are included, and to step S614 otherwise. For example, referring to FIG. 7G, provided that the predetermined number is five, as five ○-determination frames exist in a cluster among AF frames including the subject area (in a thick frame), a cluster of the predetermined number or more of ○-determination frames exists.

In step S613, the system control unit 115 determines that "the zone is to be updated", and ends the processing. In step S614, the system control unit 115 determines that "the zone is not to be updated", and ends the processing.

While the predetermined numbers in steps S605, S606, S607, S609, S611, and S612 have been described above as fixed values, they may be changed in accordance with a zone range and the in-focus position. For example, these predetermined numbers may increase as the subject approaches the near end.

As described above, if no subject exists in the scanned distance range but there is a possibility that a subject exists in zones to be scanned from that point, it is determined that the zone is to be updated. On the other hand, if a subject exists in the scanned distance range and it is considered that distance information has been identified or that no subject exists in zones to be scanned from that point, it is determined that the zone is not to be updated.

<AF Frame Selection for the Case where Subjects have been Detected>

Figure 8A:
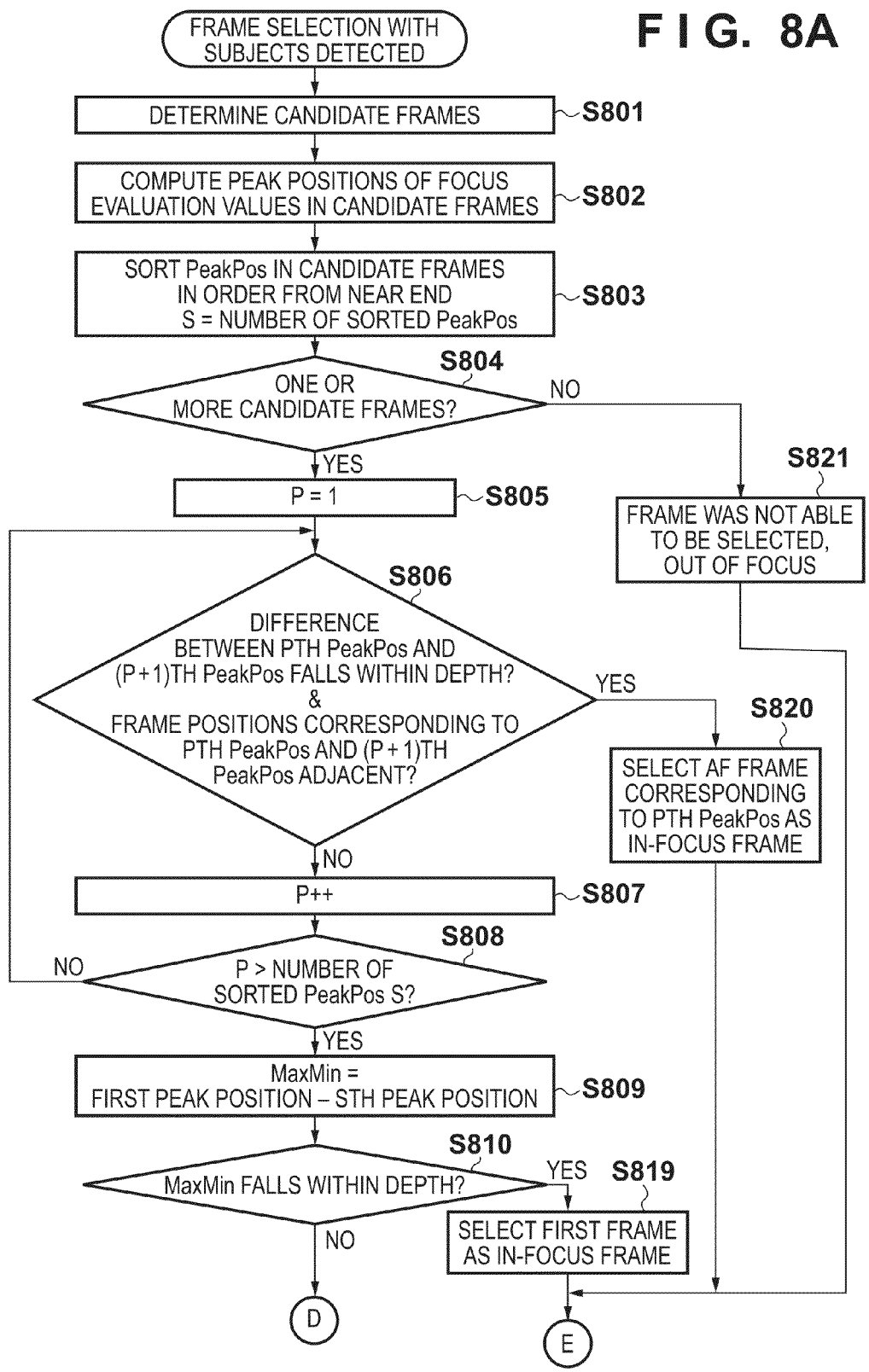

FIGS. 8A and 8B are flowcharts of the AF frame selection processing executed in step S513 of FIG. 5 for the case where subjects have been detected. In this processing, an AF frame is selected from among AF frames including subject areas.

First, in step S801, the system control unit 115 determines, out of AF frames including subject areas detected by the subject detection unit 123, AF frames for which ○ determination has been made in step S511 of FIG. 5 (in-focus AF frames) as candidate frames.

In step S802, the system control unit 115 computes and stores peak positions (hereinafter referred to as PeakPos) of focus evaluation values in candidate frames. As the positions of the focus lens for which the focus evaluation values have been obtained are discrete, the system control unit 115 computes the peak positions by way of interpolation and the like.

In step S803, the system control unit 115 sorts PeakPos in the candidate frames from the near end, and considers the number of sorted PeakPos (that is to say, the total number of candidate frames) as S.

In step S804, the system control unit 115 checks whether or not the number of sorted PeakPos S is equal to or greater than one; it proceeds to step S805 if the number S is equal to or greater than one, and proceeds to step S821 if the number S is smaller than one (there is no candidate frame). In step S821, the system control unit 115 considers that focus has not been achieved as an in-focus frame was not able to be selected, and ends the present processing.

In step S805, the system control unit 115 sets a counter P to one, the counter P indicating orders of the peak positions in the candidate frames computed in step S802 from the near end.

In step S806, the system control unit 115 checks whether or not the following conditions are satisfied: a difference between the $P^{th}$ PeakPos and the $(P+1)^{th}$ PeakPos in sort order is within the depth of focus; and the frame positions corresponding to the $P^{th}$ PeakPos and the $(P+1)^{th}$ PeakPos in the screen are adjacent. It should be noted that a range of "adjacent" frame positions is defined in advance in accordance with the frame size and the like. It should be noted that the frame positions do not necessarily have to be adjacent. If the above conditions are satisfied, the system control unit 115 proceeds to step S820, selects the AF frame corresponding to the $P^{th}$ PeakPos as the in-focus frame, and ends the processing. On the other hand, if the above conditions are not satisfied, the system control unit 115 proceeds to step S807.

In step S807, the system control unit 115 increments the counter P by one.

In step S808, the system control unit 115 checks whether or not the value of the counter P is greater than the number of sorted PeakPos S (P>S); it proceeds to step S809 if the value of the counter P is greater than the number of sorted PeakPos S, and returns to step S806 otherwise.

In step S809, the system control unit 115 computes a difference between the first PeakPos and the $S^{th}$ PeakPos, and stores the difference as a variable MaxMin. The value of MaxMin is the value of the maximum difference in peak positions in frames for which ○ determination has been made as a result of the in-focus determination.

In step S810, the system control unit 115 checks whether or not MaxMin computed in step S809 falls within the depth of focus; if MaxMin falls within the depth of focus, it selects the first AF frame (the AF frame whose peak position is closest to the near end among all frames for which ○ determination has been made as a result of the in-focus determination) as the in-focus frame in step S819, and ends the processing. Provided that the diameter of the acceptable circle of confusion is ε and the maximum aperture size of the photographic lens 101 is F, the depth of focus used in steps S806 and S810 is expressed as ±εF and is also referred to as the maximum depth.

On the other hand, if MaxMin does not fall within the depth of focus, the system control unit 115 divides the range from the first PeakPos to the $S^{th}$ PeakPos (=MaxMin) into depth-based groups in step S811.

In step S812, the system control unit 115 sets a counter N to one, the counter N indicating orders of the groups from the near end.

In step S813, the system control unit 115 counts the number of AF frames included in the $N^{th}$ group.

In step S814, the system control unit 115 checks whether or not the number counted in step S813 is greater than the counted number of frames included in the $(N-1)^{th}$ group (N≥2); it proceeds to step S815 if the former is greater than the latter, and proceeds to step S816 if the former is smaller than the latter.

In step S815, the system control unit 115 determines the AF frame whose PeakPos is closest to the near end out of all AF frames included in the $N^{th}$ group as a representative frame of the candidate frames.

In step S816, the system control unit 115 increments the counter N by one.

In step S817, the system control unit 115 checks whether or not all groups have been confirmed; it proceeds to step S818 if all groups have been confirmed, and to step S813 if all groups have not been confirmed.

In step S818, the system control unit 115 selects the representative frame as the in-focus frame, and ends the processing.

<AF Frame Selection for the Case where Subjects have not been Detected>

Figure 9:
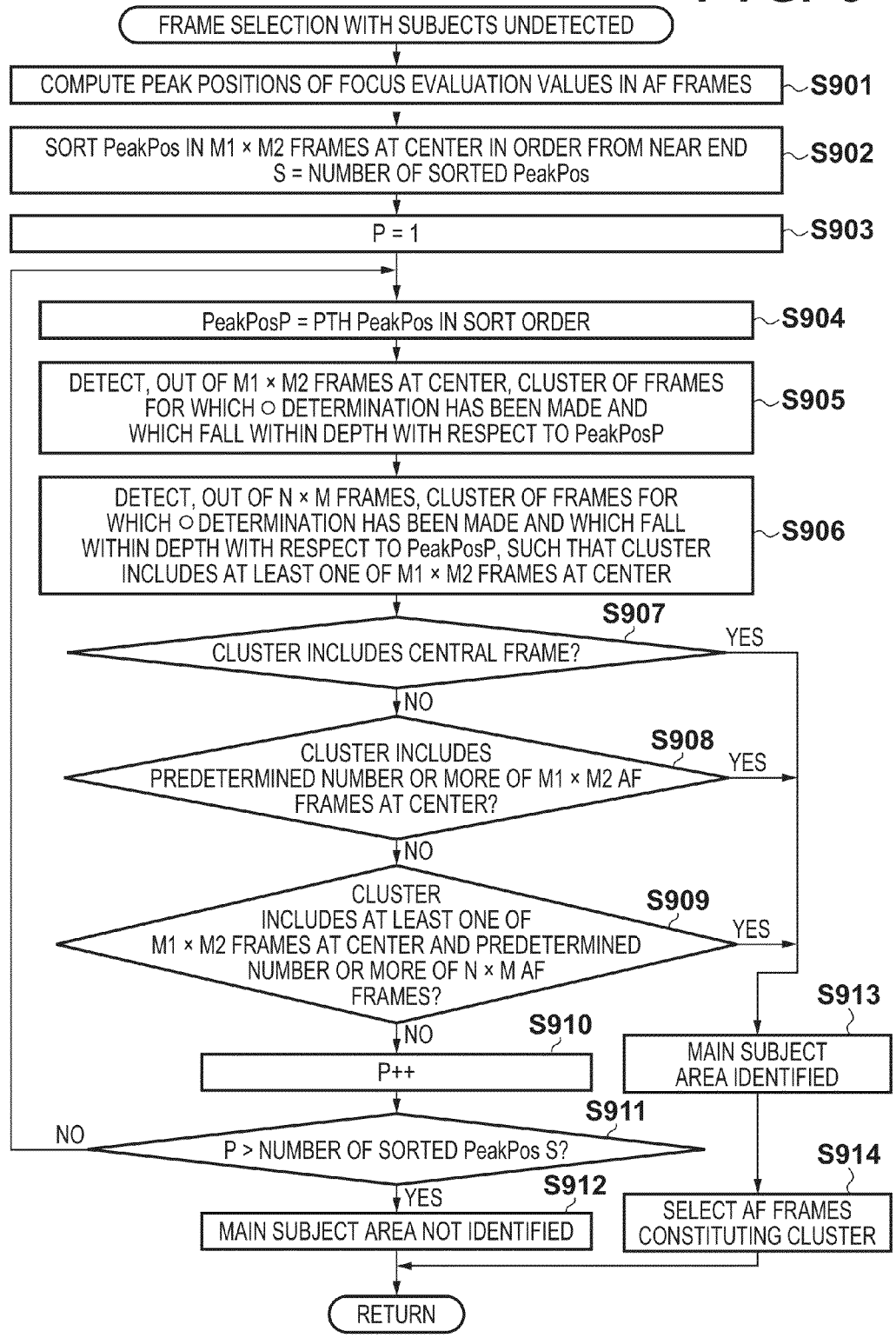
FIG. 9 is a flowchart of AF frame selection processing for the case where subjects have not been detected in the embodiment.

FIG. 9 is a flowchart of AF frame selection performed in step S514 of FIG. 5 for the case where subjects have not been detected. In this AF frame selection, a main subject area is identified from the screen, and a frame is selected from the main subject area.

FIGS. 10A to 10C are schematic diagrams for describing an example of AF frame selection for the case where subjects have not been detected in the present embodiment. It will be assumed that N×M AF frames have been set under the condition that N=7, M=9, a scan range is 0 to 300, and a predetermined depth range is ±10. It will also be assumed that the result of the in-focus determination for each AF frame in step S511 of FIG. 5 is as shown in FIG. 10A. It should be noted that the numeric values of the scan range and the predetermined depth range indicate the positions of the focus lens 104. These numeric values are equivalent to the number of driving pulses for the case where a stepping motor is used as a motor for driving the focus lens 104 included in the AF processing unit 105, and become larger toward the near end.

First, in step S901, the system control unit 115 computes and stores peak positions (hereinafter referred to as PeakPos) of focus evaluation values in AF frames. For example, it will be assumed that the result of computing the peak positions in the AF frames is as shown in FIG. 10B. The peak positions are expressed using the aforementioned number of driving pulses.

In step S902, the system control unit 115 sorts PeakPos in M1×M2 AF frames at the center (indicated by a thick frame in FIG. 10B) in order from the near end, and considers the number of sorted PeakPos as S, M1 and M2 being along the horizontal direction and the vertical direction, respectively. In the following description, it will be assumed that M1=3 and M2=5. Out of these 15 AF frames, AF frames for which X determination has been made in the in-focus determination in step S511 of FIG. 5 are excluded from the sorting as peak positions cannot be computed therein. For example, in the case of FIG. 10B, the result of the sorting provides 202, 202, 201, 201, 201, 200, 200, 200, 103, 103, 102, 102, and 101 in order from the near end, and the number of sorted PeakPos S is 13.

In step S903, the system control unit 115 sets a counter P to one, the counter P indicating orders of the peak positions in the M1×M2 frames computed in step S902 from the near end.

In step S904, the system control unit 115 considers the $P^{th}$ PeakPos in sort order as PeakPosP. For example, in the case of FIG. 10B, provided P=1, PeakPosP=202.

In step S905, the system control unit 115 detects, out of the M1×M2 AF frames at the center, a "cluster" of AF frames for which ○ determination has been made and which fall within a predetermined depth range with respect to PeakPosP, and stores the number and positions of AF frames constituting this "cluster". It should be noted that a "cluster" indicates the state where AF frames satisfying the above conditions are adjacent. Furthermore, in the case where a plurality of "clusters" exist, one of the plurality of "clusters" may be selected based on the number of AF frames constituting each "cluster" and on the positions of the "clusters".

In step S906, the system control unit 115 detects, out of the N×M AF frames, a "cluster" of AF frames for which ○ determination has been made and which fall within a predetermined depth with respect to PeakPosP, such that the "cluster" includes at least one of the M1×M2 AF frames at the center, and stores the number and positions of AF frames constituting the "cluster". For example, in the case where the result of determination is as shown in FIGS. 10A and 10B, a "cluster" indicated by gray frames shown in FIG. 10C is detected.

In step S907, the system control unit 115 checks whether or not the "cluster" detected in step S905 or S906 includes the central frame (N=M=4) in the screen; it proceeds to step S913 if the "cluster" includes the central frame, and to step S908 otherwise.

In step S908, the system control unit 115 checks whether or not the "cluster" detected in step S905 or S906 includes a predetermined number or more of the M1×M2 AF frames; it proceeds to step S913 if the "cluster" includes the predetermined number or more of the M1×M2 AF frames, and to step S909 otherwise.

In step S909, the system control unit 115 checks whether or not the "cluster" detected in step S905 or S906 includes at least one of the M1×M2 frames at the center and includes a predetermined number or more of the N×M AF frames. The system control unit 115 proceeds to step S913 if the "cluster" includes at least one of the M1×M2 frames at the center and includes a predetermined number or more of the N×M AF frames, and proceeds to step S910 otherwise.

In step S910, the system control unit 115 increments the counter P by one.

In step S911, the system control unit 115 checks whether or not the value of the counter P is greater than the number of sorted PeakPos S (P>S); if the value of the counter P is greater than the number of sorted PeakPos S, it proceeds to step S912, determines that the main subject area was not able to be identified, and ends the present determination processing. On the other hand, if the value of the counter P is equal to or smaller than the number of sorted PeakPos S, the processing returns to step S904.

In step S913, the system control unit 115 determines that the main subject area was able to be identified.

In step S914, the system control unit 115 determines and selects the AF frames constituting the cluster detected in step S907, S908 or S909 as the main subject area, and ends the present determination processing.

It should be noted that the predetermined numbers in steps S908 and S909 may be uniformly determined irrespective of the focus position, and may be changed in accordance with the focus position. For example, these predetermined numbers may increase as the subject approaches the near end.

<Equidistance Determination>

Figure 11:
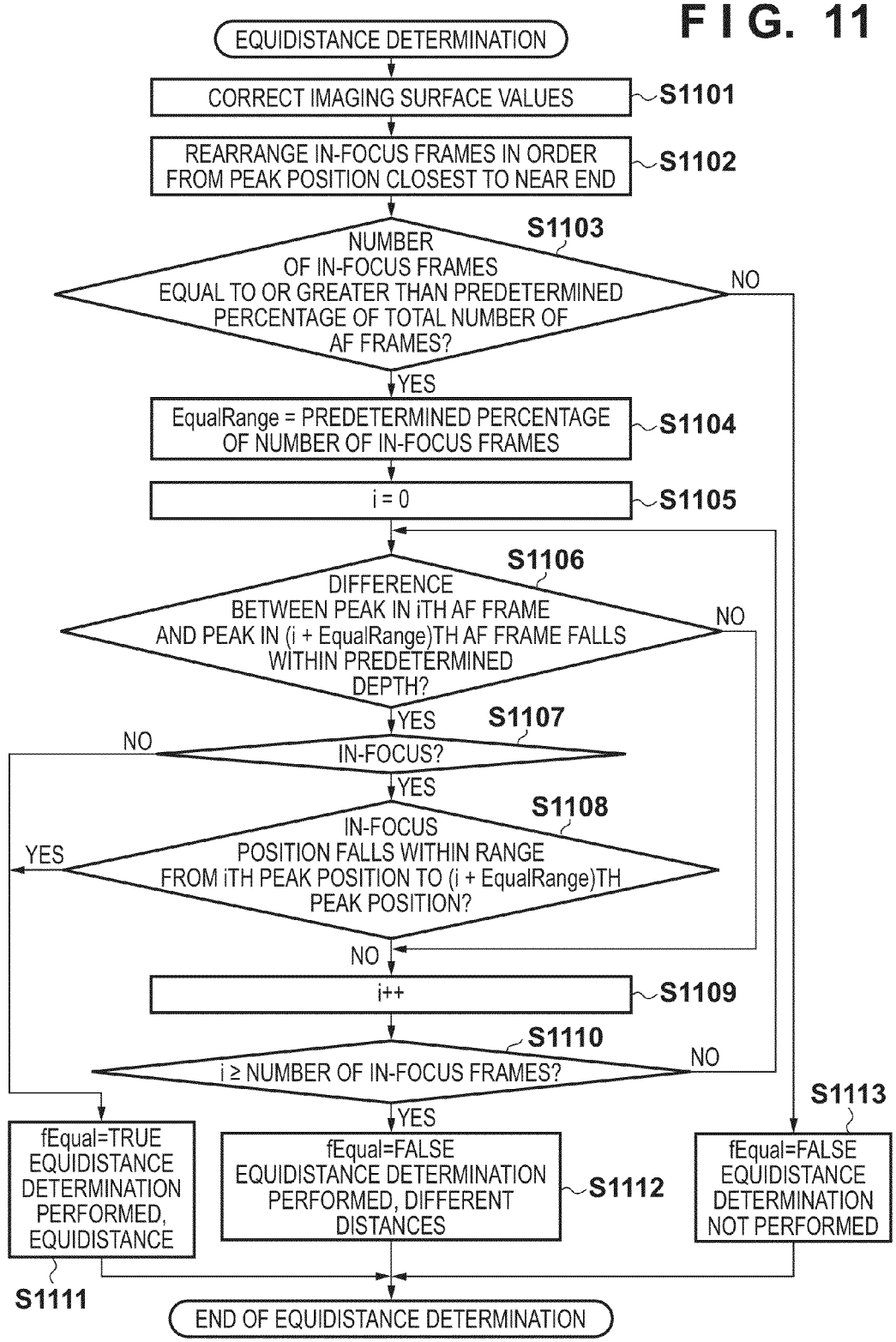
FIG. 11 is a flowchart of equidistance determination processing according to the embodiment.

FIG. 11 is a flowchart of the equidistance determination in steps S305 and S308 of FIG. 3. This equidistance determination involves determination of whether or not a captured scene is an equidistance scene with a small difference in distance in the screen based on the distribution of peak positions in AF frames.

In step S1101, the system control unit 115 corrects the peak positions in the AF frames based on error amounts that have been prepared in advance in correspondence with image heights. This is because there may be error in the distribution of peak positions due to the influence of the field curvature and of the image tilt caused by error in the attachment of the image sensor.

In step S1102, the system control unit 115 rearranges the AF frames for which ○ determination has been made in step S601 of FIG. 6 (in-focus AF frames) in order from the peak position closest to the near end.

In step S1103, the system control unit 115 checks whether or not the number of the ○-determination frames is equal to or greater than a predetermined percentage of the total number of AF frames; if the number of the ○-determination frames is not equal to or greater than the predetermined percentage, it determines in step S1113 that the equidistance determination was not able to be performed, and ends the processing for the equidistance determination. In the present embodiment, if the number of the ○-determination frames is not equal to or greater than the predetermined percentage of the total number of AF frames, the equidistance determination cannot be performed correctly because the number of the ○-determination frames is small. On the other hand, if the number of the ○-determination frames is equal to or greater than the predetermined percentage of the total number of AF frames, the system control unit 115 proceeds to step S1104.

In step S1104, the system control unit 115 sets a predetermined percentage of the number of the ○-determination frames as a range that is considered as equidistant (EqualRange).

In step S1105, the system control unit 115 resets a variable i to zero, the variable i being used to count the number of the ○-determination frames.

In step S1106, the system control unit 115 checks whether or not a difference between the peak position in the $i^{th}$ AF frame and the peak position in the $(i+EqualRange)^{th}$ AF frame falls within a predetermined depth; it proceeds to step S1107 if the difference falls within the predetermined depth, and to step S1109 if the difference does not fall within the predetermined depth.

In step S1107, the system control unit 115 checks whether or not focus was achieved in the immediately previous scan (step S304 or S307 of FIG. 3); it proceeds to step S1108 if focus was achieved, and to step S1111 if focus was not achieved.

In step S1108, the system control unit 115 checks whether or not the in-focus position detected in the immediately previous scan falls within a range from the peak position in the $i^{th}$ AF frame and the peak position in the $(i+EqualRange)^{th}$ AF frame, and proceeds to step S1111 if the detected in-focus position falls within the range.

In step S1111, the system control unit 115 determines that the equidistance determination was able to be performed and the captured scene is the equidistance scene, and ends the processing.

On the other hand, if the in-focus position detected in the immediately previous scan does not fall within the range from the peak position in the $i^{th}$ AF frame and the peak position in the $(i+EqualRange)^{th}$ AF frame, the system control unit 115 increments i by one in step S1109, and proceeds to step S1110.

In step S1110, if i is smaller than the total number of the ○-determination frames, the system control unit 115 returns to step S1106 and continues the determination. On the other hand, if i is equal to or greater than the total number of the ○-determination frames, it is determined that the determination has been performed for all of the ○-determination frames; therefore, in step S1112, it is determined that the equidistance determination was able to be performed and the captured scene exhibits different distances, and then the processing is ended.

<Continuous AF>

Figure 12A:
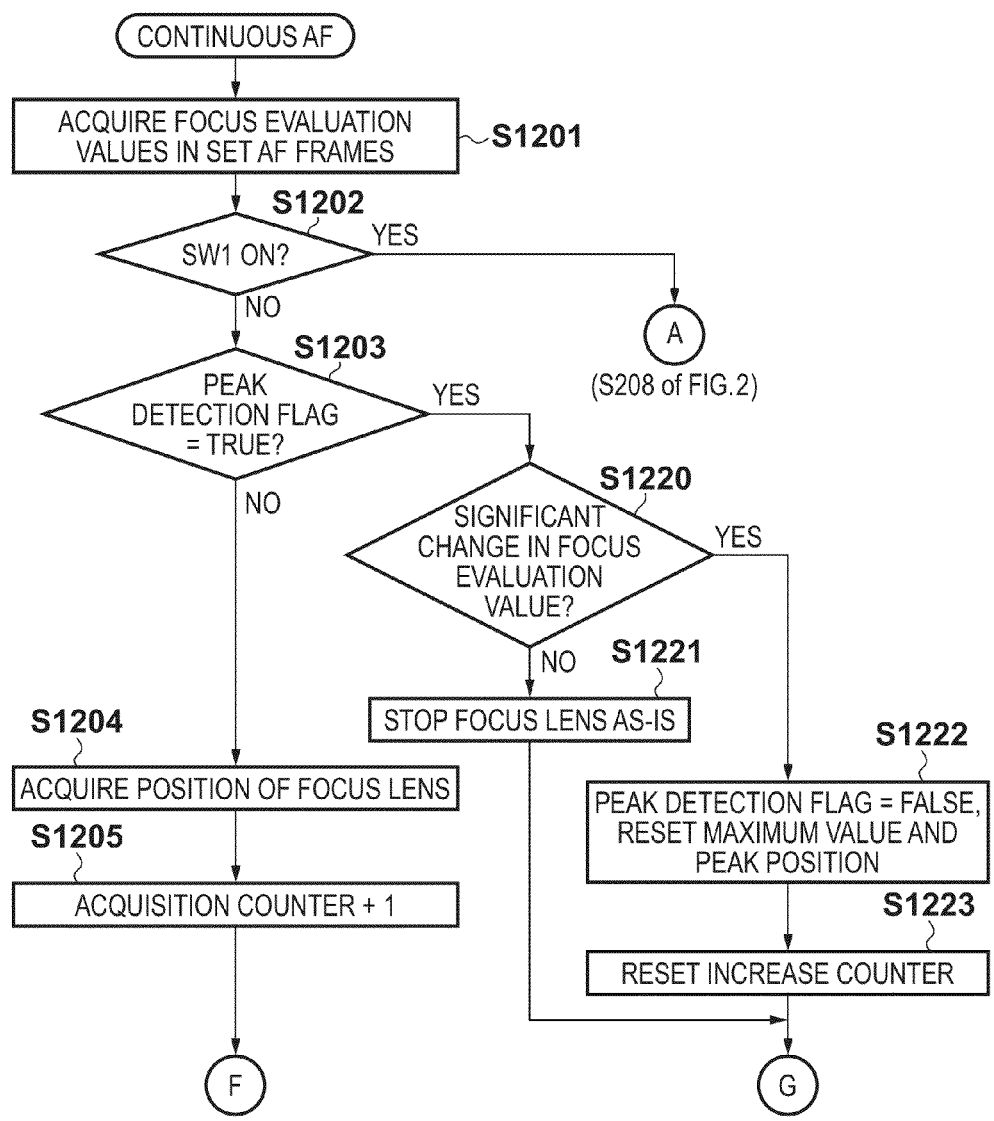
FIGS. 12A and 12B are flowcharts of a continuous AF operation according to the embodiment.
Figure 12B:
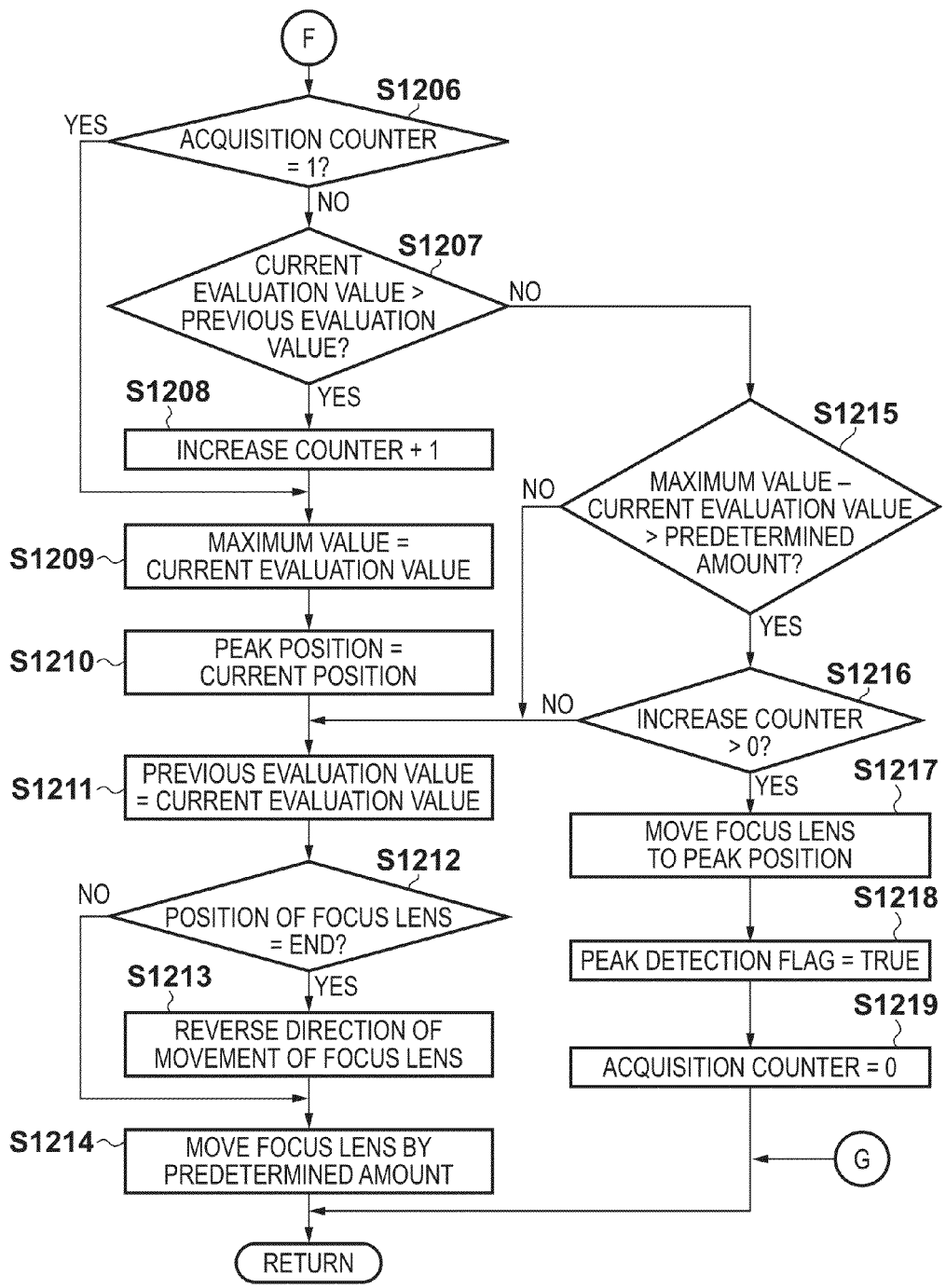

FIGS. 12A and 12B are flowcharts of a continuous AF operation executed in step S205 of FIG. 2.

In step S1201, the system control unit 115 acquires focus evaluation values of AF frames that have been set for in-focus control in continuous AF. It should be noted that the AF frames that have been set for in-focus control in continuous AF denote AF frames that have been set in subject areas in the case where the subject areas have been detected, and denote AF frames that have been selected as in-focus frames in step S513 of FIG. 5 in the case where the subject areas have not been detected.

In step S1202, the system control unit 115 determines the state (ON/OFF) of SW1 used to issue an instruction for image capture preparation; if SW1 is in the ON state, it ends the present processing and proceeds to step S208 of FIG. 2, and if SW1 is in the OFF state, it proceeds to step S1203.

In step S1203, the system control unit 115 checks whether or not a peak detection flag is set to TRUE; it proceeds to steps S1220 and S1204 if the peak detection flag is set to TRUE and FALSE, respectively. It will be assumed that the peak detection flag is preset to FALSE as a default value.

In step S1204, the system control unit 115 acquires the current position of the focus lens 104.

In step S1205, the system control unit 115 increments an acquisition counter by one, the acquisition counter being used to count the acquisition of the focus evaluation values and the acquisition of the current position of the focus lens 104. It will be assumed that this acquisition counter is preset to zero in a reset operation.

In step S1206, the system control unit 115 checks whether or not the value of the acquisition counter is one; it proceeds to step S1209 if the value of the acquisition counter is one, and to step S1207 if the value of the acquisition counter is not one.

In step S1207, the system control unit 115 checks whether or not the "current focus evaluation value" is greater than the "previous focus evaluation value"; it proceeds to step S1208 if the former is greater than the latter, and to step S1215 otherwise.

In step S1208, the system control unit 115 increments an increase counter by one.

In step S1209, the system control unit 115 stores the current focus evaluation value as the maximum focus evaluation value into an operation memory in the system control unit 115.

In step S1210, the system control unit 115 stores the current position of the focus lens 104 as the peak position of the focus evaluation values into the operation memory.

In step S1211, the system control unit 115 stores the current focus evaluation value into the operation memory as the previous focus evaluation value.

In step S1212, the system control unit 115 checks whether or not the current position of the focus lens 104 is at the end of a driving range; it proceeds to step S1213 if the current position is at the end of the driving range, and to step S1214 otherwise.

In step S1213, the system control unit 115 reverses the direction of movement of the focus lens 104.

In step S1214, the system control unit 115 moves the focus lens 104 by a predetermined amount.

In step S1215, the system control unit 115 proceeds to step S1216 if "the maximum focus evaluation value—the current focus evaluation value" is greater than a predetermined amount, and to step S1211 if "the maximum focus evaluation value—the current focus evaluation value" is equal to or smaller than the predetermined amount. It will be assumed that, if "the maximum focus evaluation value—the current focus evaluation value" is greater than the predetermined amount, that is to say, if the current focus evaluation value has decreased from the maximum focus evaluation value by the predetermined amount, the maximum focus evaluation value is considered as the focus evaluation value at the peak position.

In step S1216, the system control unit 115 checks whether or not the value of the increase counter is greater than zero; it proceeds to step S1217 if the value of the increase counter is greater than zero, and to step S1211 if the value of the increase counter is equal to or smaller than zero.

In step S1217, the system control unit 115 moves the focus lens 104 to the peak position stored in step S1210.

In step S1218, the system control unit 115 sets the peak detection flag to TRUE.

In step S1219, the system control unit 115 sets the acquisition counter to zero.

In step S1220, the system control unit 115 checks whether or not the current focus evaluation value has changed from the maximum focus evaluation value by a predetermined percentage or more; it proceeds to step S1222 if the current focus evaluation value has changed significantly, that is to say, by the predetermined percentage or more, and to step S1221 if the current focus evaluation value has changed insignificantly, that is to say, by a percentage smaller than the predetermined percentage.

In step S1221, the system control unit 115 keeps the position of the focus lens 104 as-is.

In step S1222, in order to re-acquire the position of the focus lens that maximizes the focus evaluation value, the system control unit 115 sets the peak detection flag to FALSE and resets the maximum focus evaluation value and the peak position.

In step S1223, the system control unit 115 resets the increase counter.

In the above manner, the continuous AF operation drives the focus lens so as to place a main subject in a focused state at any time.

<Bracketing Determination>

Figure 13:
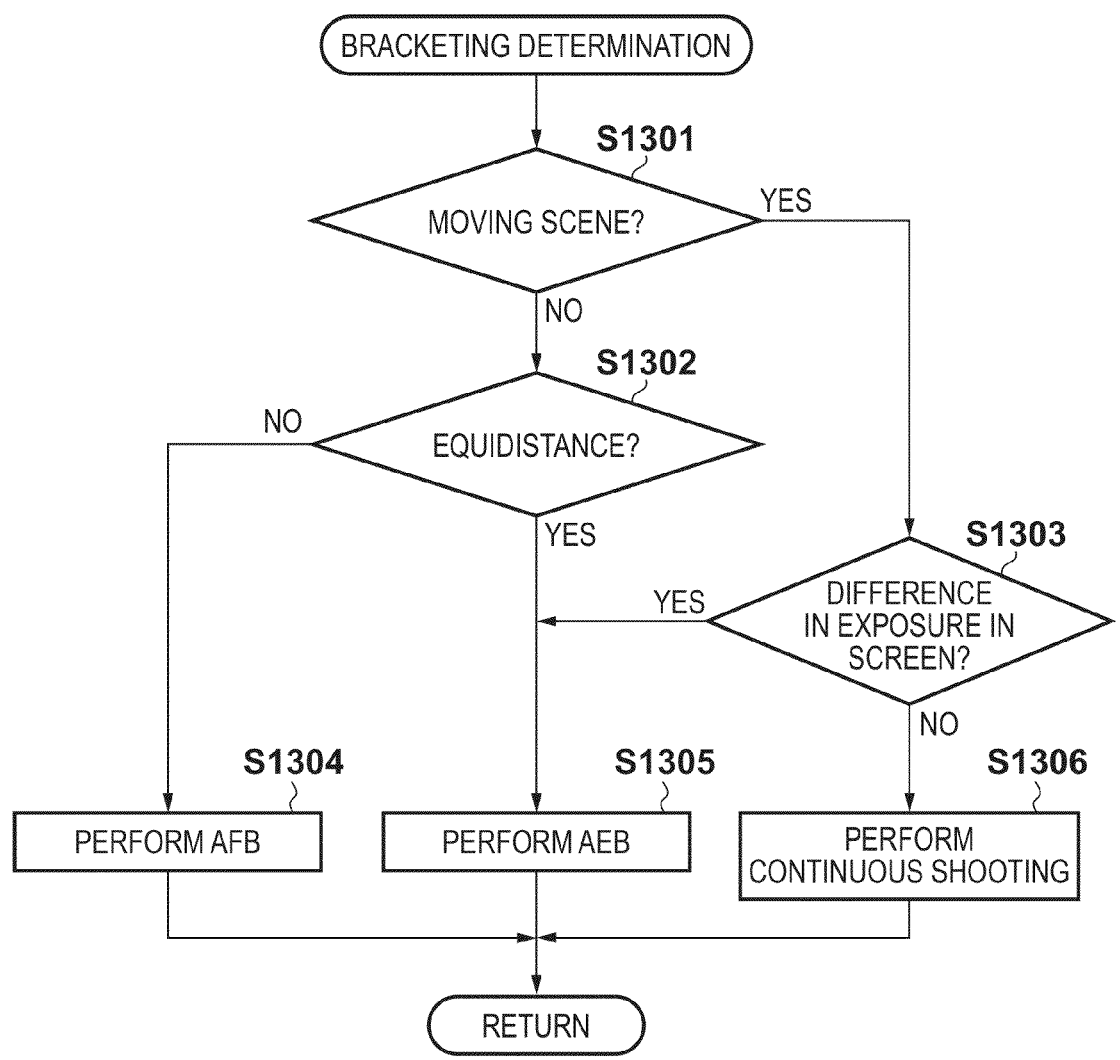
FIG. 13 is a flowchart of bracketing determination processing according to the embodiment.

FIG. 13 is a flowchart of processing for bracketing determination in step S208 of FIG. 2. This processing determines the optimal processing for image capture based on information that was acquired before SW1 was turned ON.

In step S1301, the system control unit 115 determines whether or not the digital camera or subjects are moving by referring to the result of output from the angular velocity sensor 125 and the moving-object detection unit 124 immediately before SW1 was turned ON. If the camera or subjects are moving, the system control unit 115 determines that the captured scene is a moving scene and proceeds to step S1303; if the captured scene is not a moving scene, it proceeds to step S1302.

In step S1302, the system control unit 115 proceeds to step S1305 if the captured scene was determined as an equidistance scene in the equidistance determination in step S305 or S308 of FIG. 3 immediately before SW1 was turned on, and proceeds to step S1304 if the captured scene was not determined as an equidistance scene.

In step S1304, the system control unit 115 determines that AF bracketing is to be performed as processing for image capture, and ends the present processing.

In step S1303, the system control unit 115 acquires the exposure distribution in the screen immediately before SW1 was turned ON from the AE processing unit 103; it proceeds to step S1305 if the captured scene is determined as a scene exhibiting different exposures in the screen, and to step S1306 if the captured scene is determined as a scene with no difference in exposure in the screen.

In step S1305, the system control unit 115 determines that AE bracketing is to be performed as processing for image capture, and ends the present processing.

In step S1306, the system control unit 115 determines that continuous shooting is to be performed as processing for image capture, and ends the present processing.

<AF for Regular Exposure>

FIG. 14 is a flowchart of an operation of AF for regular exposure executed in step S210 of FIG. 2. This processing involves acquisition of distance information and AF scan for determining the in-focus position. The distance information is used for generating the result of grouping in accordance with the distance distribution in the screen (hereinafter referred to as a distance map), and for the above-described equidistance determination processing.

First, in step S1401, the system control unit 115 moves the focus lens 104 to a scan start position. It will be assumed that the scan start position corresponds to the farthest point in a range in which AF scan can be performed, such as the far end.

In step S1402, the system control unit 115 proceeds to step S1409 if it has determined that continuous shooting is to be performed during image capture as a result of bracketing determination in step S208 of FIG. 2, and to step S1403 if it has determined that AF bracketing or AE bracketing is to be performed.

Figure 15A:
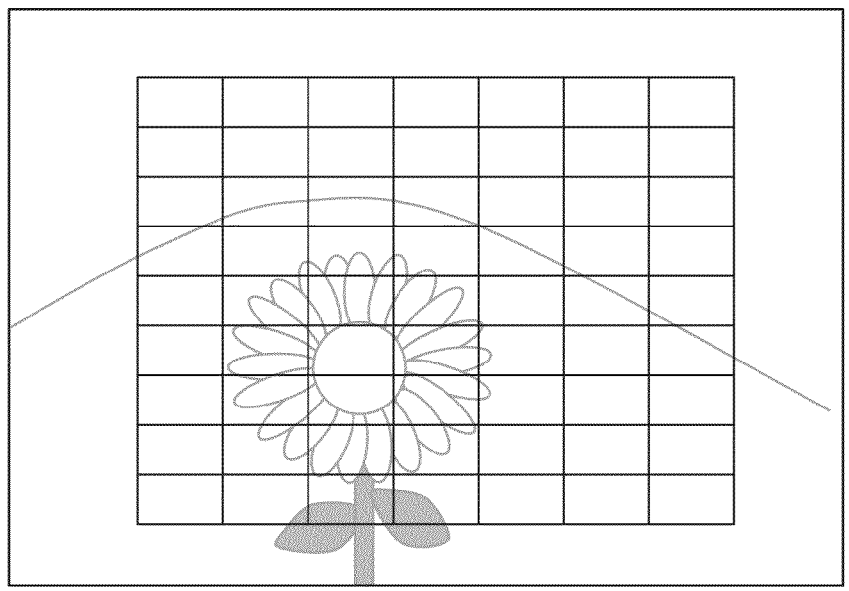
FIG. 15A shows an example of AF frames set in the AF operation for regular exposure.

In step S1403, the system control unit 115 sets N×M AF frames in order to acquire the distance map (FIG. 15A). It will be assumed that the AF frames are set under the condition that N=7 and M=9, similarly to the case of FIG. 4.

In step S1404, in order to acquire the distance map, the system control unit 115 performs AF scan in which the peak positions are searched for in all of the AF frames set in step S1403.

In step S1405, the system control unit 115 determines the in-focus position based on the peak positions in the AF frames obtained as a result of the scan performed in step S1404.

In step S1407, the system control unit 115 performs the equidistance determination, which has been described above with reference to FIG. 11.

Figure 15B:
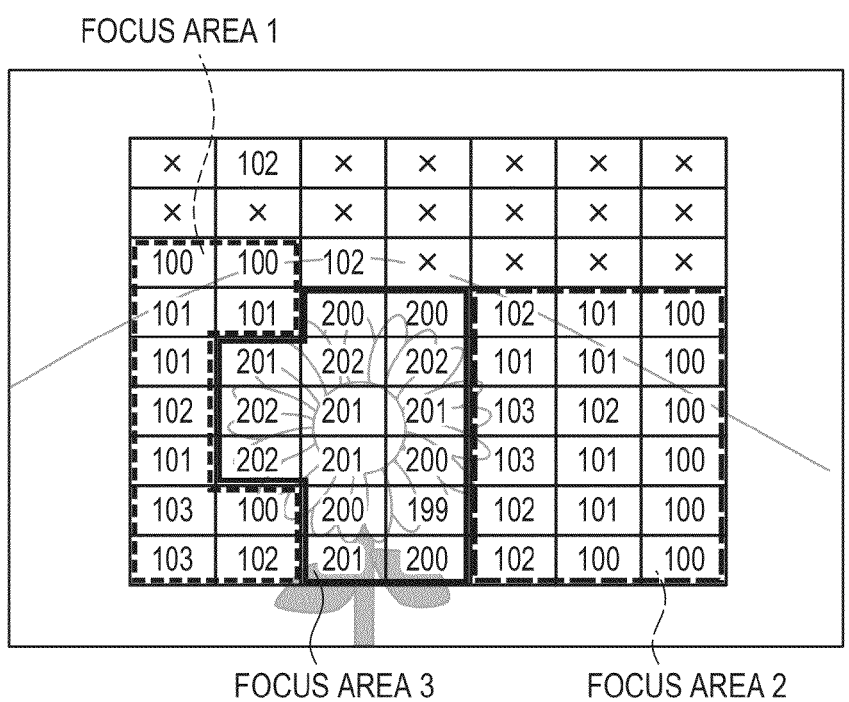
FIG. 15B schematically shows peak positions acquired in AF frames.

In step S1408, the system control unit 115 generates the distance map based on the distribution of the peak positions in the AF frames corrected in step S1101 of the equidistance determination. FIG. 15B schematically shows the peak positions in the AF frames for the case where the flower in the foreground and the mountain in the background have been captured. X indicates that the peak positions were not found. It will be assumed that the peak positions are expressed using the number of pulses of the stepping motor, similarly to the case of FIG. 10B. The flower in the foreground exhibits the distribution of peak positions in a range of 199 to 202, and the mountain in the background exhibits the distribution of peak positions in a range of 100 to 103.

As shown in FIG. 15B, by grouping adjacent AF frames with close peak positions, three focus areas can be extracted from the AF frames in which the peak positions have been acquired. Considering that the peak positions in the focus area 1 are close to the peak positions in the focus area 2, merging them into one focus area allows the screen to be divided into a background group composed of the focus areas 1, 2 and a foreground subject group composed of the focus area 3. In the above manner, the screen is divided into a plurality of groups based on distance. Furthermore, the accuracy of grouping may be improved by combining the result of dividing the screen based on color through the image processing unit 110 and the result of dividing the screen based on distance.

In step S1409, the system control unit 115 sets AF frames in correspondence with the positions of subjects in the case where the subjects have been detected by the subject detection unit 123, and sets multiple AF frames in the case where subjects have not been detected. It should be noted that, if it is determined to perform continuous shooting processing in the bracketing determination processing, it means that the subjects or the camera is moving, and therefore the accuracy of focus in the AF frames is lowered due to the influence of the movement on the focus evaluation values. Therefore, in this case, distance-based area division is not performed, and AF scan is performed only to determine the in-focus position.

In step S1410, the system control unit 115 performs AF scan to determine the in-focus position. In the case where subjects have been detected, this AF scan is performed until the peak positions are found in the AF frames set in correspondence with the positions of the detected subjects, and in the case where subjects have not been detected, this AF scan is performed until a cluster of AF frames with close peak positions are acquired from among multiple AF frames.

In step S1411, the system control unit 115 determines the in-focus position based on the peak positions in the AF frames acquired as a result of the scan performed in step S1410. In the case where subjects have been detected, the peak positions in the AF frames set in correspondence with the positions of the detected subjects are used as the in-focus position, and if the peak positions were not able to be detected in the AF frames set in correspondence with the positions of the detected subject, focus is not achieved. In the case where subjects have not been detected, if a cluster of AF frames with close peak positions has been acquired, AF frames for determining the in-focus position are determined from among the cluster of AF frames; if the cluster of AF frames has not been acquired, focus is not achieved.

In step S1412, if the in-focus position was determined in step S1407 or S1410, the system control unit 115 causes the AF processing unit 105 to drive the focus lens 104 to the in-focus position. If focus was not achieved, the system control unit 115 drives the focus lens 104 to a fixed point which has been determined in advance and at which there is a high probability of existence of a subject.

In step S1413, the system control unit 115 displays in-focus frames and/or out-of-focus frames on the display unit 117. If focus has been achieved, the system control unit 115 displays the focus position and AF frames that fall within the depth thereof, and if focus has not been achieved, it displays out-of-focus frames at a predetermined position, such as a center.

Figure 17A:
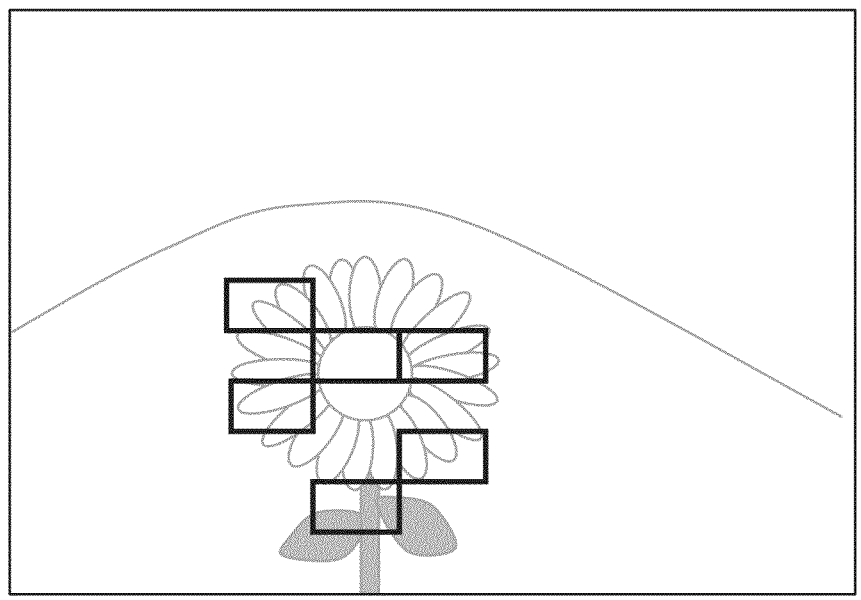
FIGS. 17A and 17B show examples of in-focus frames displayed in the case where scan has been performed to acquire a distance map in the embodiment.
Figure 17B:
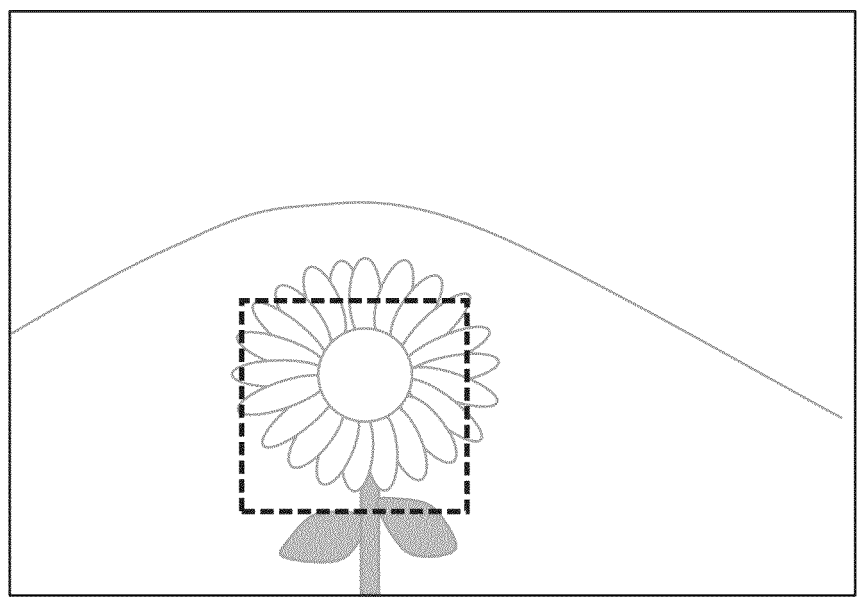

It should be noted that, when performing the scan to acquire the distance map in step S1404, due to a large number of set AF frames, displaying all of the in-focus frames and the AF frames falling within the depth would make the displayed frames look disorganized. In view of this, the areas including the in-focus position and the AF frames falling within the depth, which are shown in FIG. 17A (the areas indicated by solid lines), are displayed after resetting therefor a frame for in-focus display shown in FIG. 17B (the area indicated by a dashed line).

<Image Capture Processing>

FIG. 16 is a flowchart of an operation for the image capture processing executed in step S212 of FIG. 2. In this operation, appropriate image capture processing and image processing are executed in accordance with the result of bracketing determination in step S208 of FIG. 2, and with the result of equidistance determination in step S1407 of AF processing for regular exposure shown in FIG. 14.

In step S1601, the system control unit 115 checks which processing has been determined to be executed during image capture as a result of bracketing determination in step S208 of FIG. 2. The system control unit 115 proceeds to steps S1602, S1605, and S1607 if AF bracketing, AE bracketing, and continuous shooting have been determined to be executed, respectively.

In step S1602, the system control unit 115 proceeds to step S1605 if the captured scene was determined as an equidistance scene in the equidistance determination of step S1407 in AF for regular exposure shown in FIG. 14, and proceeds to step S1603 if the captured scene was not determined as an equidistance scene.

In step S1603, the system control unit 115 determines the focus position at which AF bracketing is to be performed based on distances of groups divided in step S1408 of FIG. 14.

In step S1604, the system control unit 115 performs image capture with AF bracketing at the focus position determined in step S1603. As the captured scene was not determined as an equidistance scene as a result of the equidistance determination, that is to say, as the captured scene was determined to exhibit different subject distances in the screen, AF bracketing is effective for the captured scene.

In step S1605, the system control unit 115 determines exposure settings for AE bracketing based on the result of a difference in exposures in the screen immediately before SW1 was turned on, which was acquired by the AE processing unit 103, and then proceeds to step S1606.

In step S1606, the system control unit 115 performs image capture with AE bracketing based on the exposure settings determined in step S1605.

In step S1607, the system control unit 115 determines the speed of continuous shooting based on the result of output from the angular velocity sensor 125 and the moving-object detection unit 124 immediately before SW1 was turned ON such that, for example, the speed of continuous shooting is faster for larger camera/subject movements, and then proceeds to step S1608.

In step S1608, the system control unit 115 performs continuous shooting image capture while controlling each component in accordance with the speed determined in step S1607.

In step S1609, the system control unit 115 causes the image processing unit 110 to generate images by applying defocus effect processing to certain areas in captured images that were acquired through the image capture with focus bracketing in step S1604 in accordance with the distance distribution, the certain areas being areas other than the main subject area in the screen. At this time, the result of grouping performed in step S1408 of FIG. 14 and the distribution of distances and colors in the screen may be used. In the present scenario, processing related to airbrushing is executed only if the captured scene was determined to exhibit different subject distances as a result of the equidistance determination, and therefore the airbrushing processing based on the distance distribution can be executed with high accuracy.

In step S1610, the system control unit 115 generates images by extracting a part of the screen based on the detected subject areas, on the result of grouping performed in step S1408 of FIG. 14, and on the distribution of distances and colors in the screen.

<Scene Instability Determination>

Figure 18:
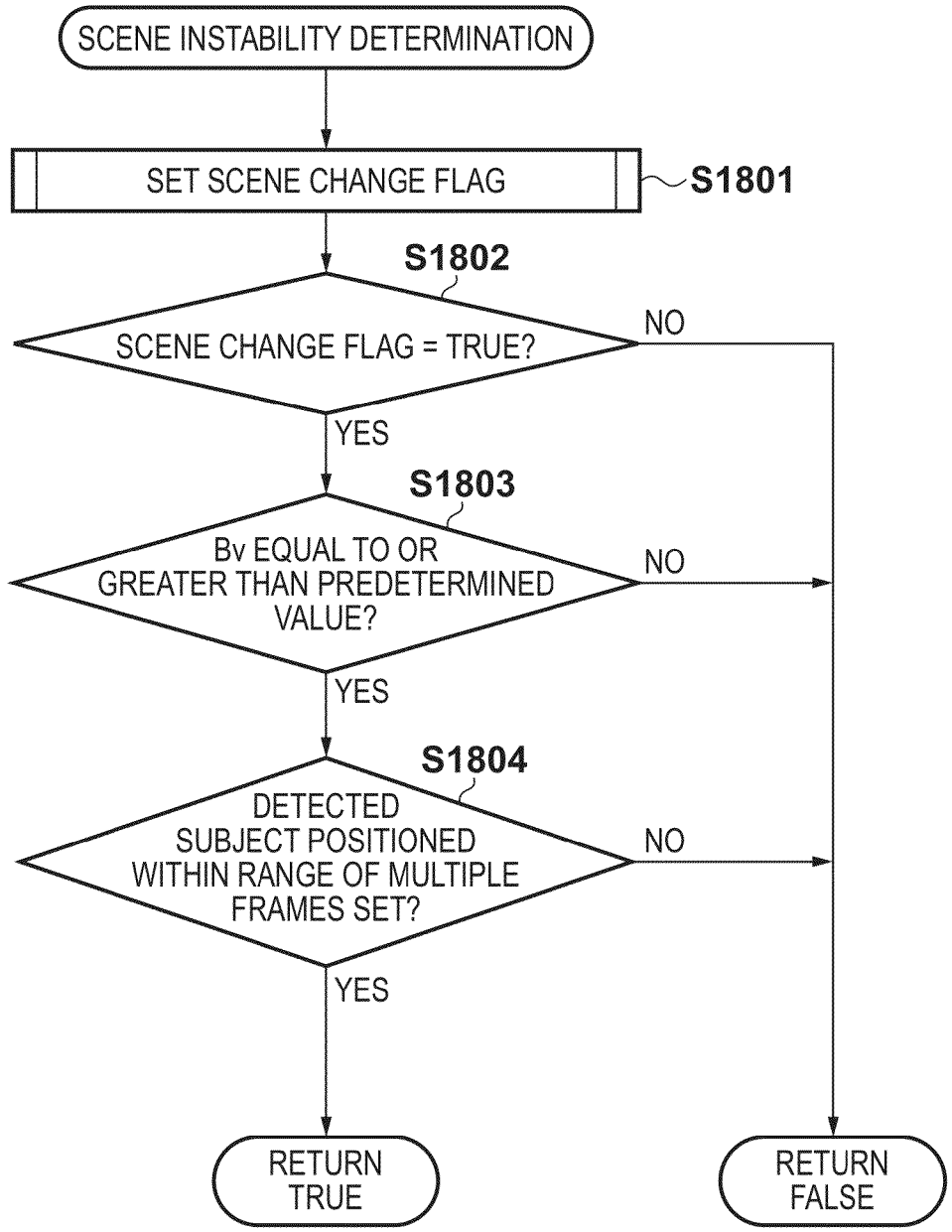
FIG. 18 is a flowchart of an operation for scene instability determination according to the embodiment.

FIG. 18 shows a flowchart of an operation for the scene instability determination in step S206 of FIG. 2. In step S1801, the system control unit 115 sets a scene change flag. A specific description will be provided later with reference to FIGS. 19A and 19B.

In step S1802, the system control unit 115 proceeds to step S1803 if the scene change flag is set to TRUE, and returns FALSE as a result of the scene instability determination otherwise.

In step S1803, if the subject luminance Bv acquired by the AE processing unit 103 is equal to or greater than a predetermined value, the system control unit 115 proceeds to step S1804. On the other hand, if the subject luminance Bv is smaller than the predetermined value, the accuracy of AF scan is lowered even with a change in the scene, and therefore the system control unit 115 returns FALSE as a result of determination so as to continue the execution of continuous AF.

In step S1804, the system control unit 115 determines whether or not the main subject has moved to the outside of the area of the AF frames set in step S301 of FIG. 3, and returns TRUE if the subject is inside the area of the AF frames. If the main subject is not inside the area of the AF frames, AF scan cannot be performed, and therefore FALSE is returned as a result of determination so as to continue the execution of continuous AF.

<Setting of Scene Change Flag>

Figure 19A:
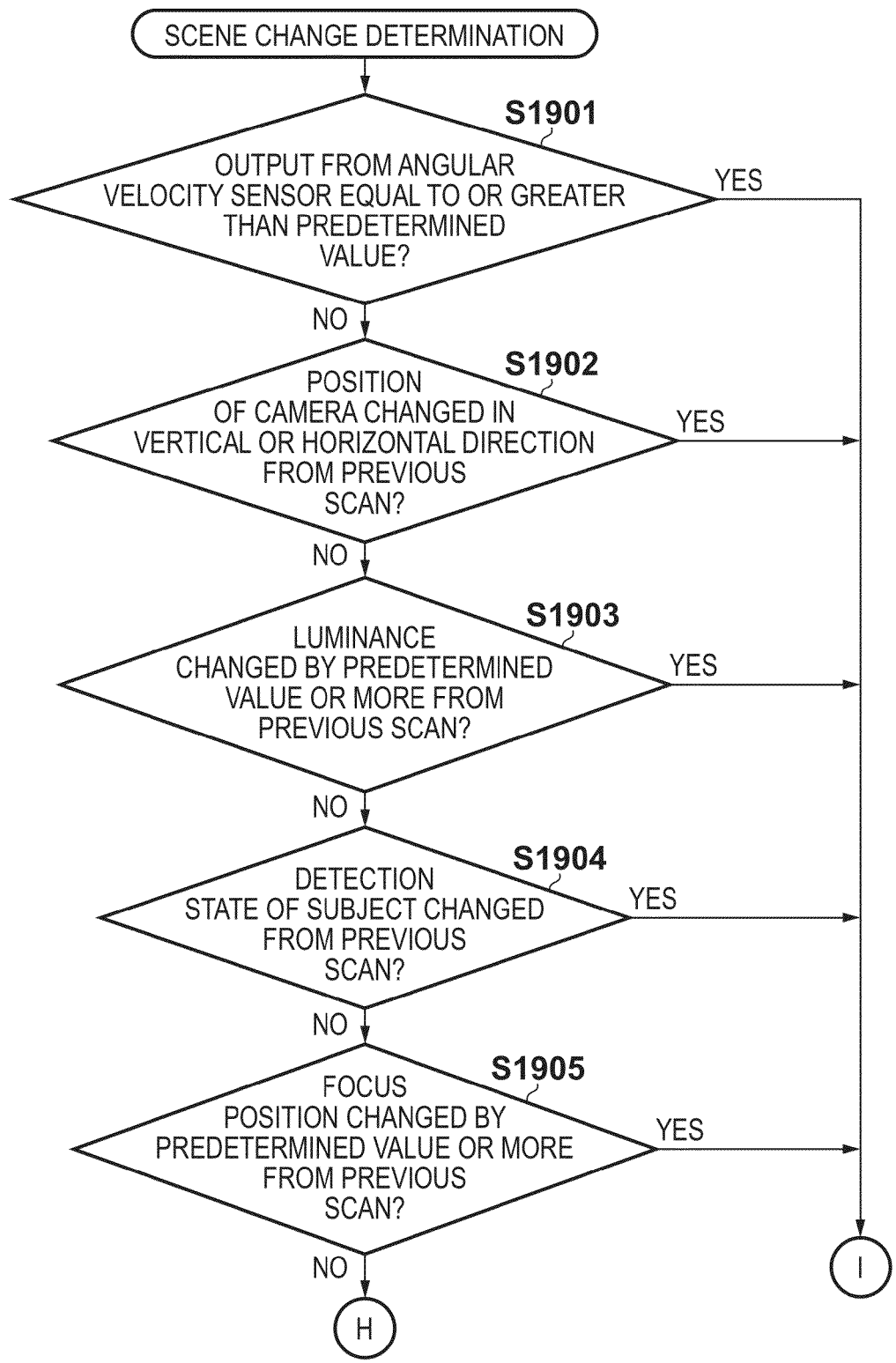
FIGS. 19A and 19B are flowcharts of processing for setting a scene change flag according to the embodiment.
Figure 19B:
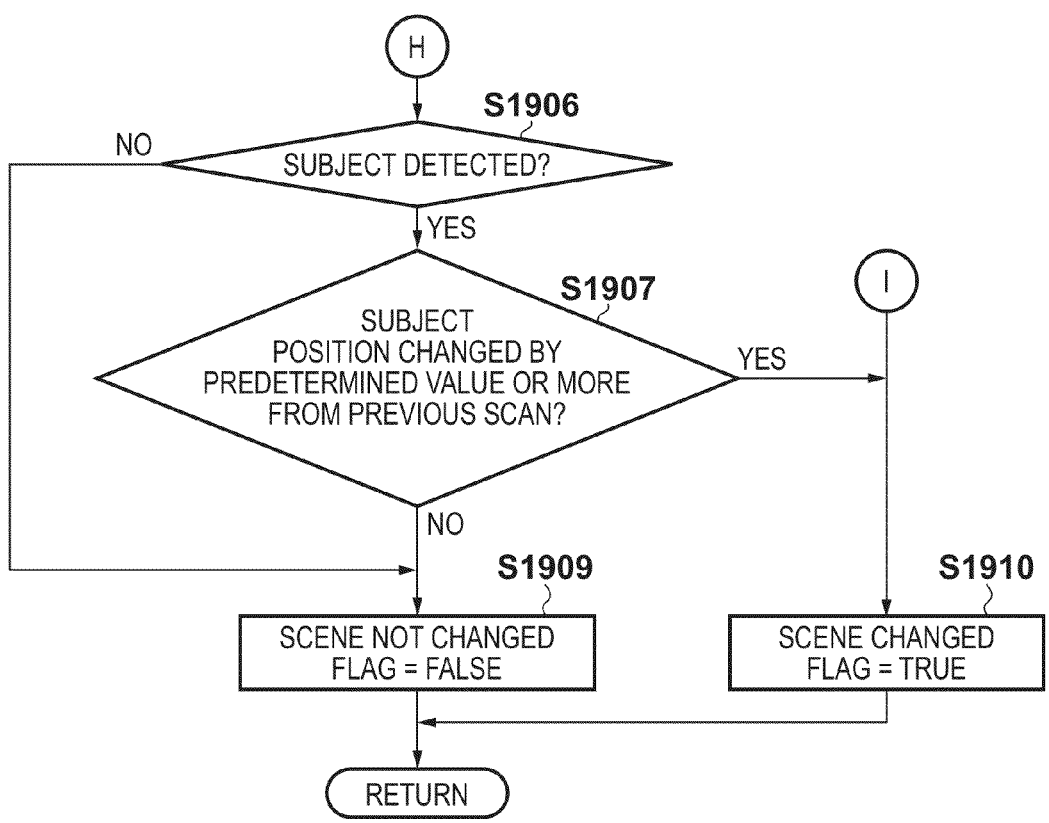

FIGS. 19A and 19B are flowcharts of processing for setting the scene change flag in step S1801 of FIG. 18. In step S1901, the system control unit 115 refers to the output from the angular velocity sensor 125 in order to determine whether or not the user is yet to determine a capturing scene. If the output from the angular velocity sensor 125 is equal to or greater than a predetermined value, the system control unit 115 determines that the scene is yet to be determined and that the scene has changed, sets the scene change flag to TRUE in step S1910, and ends the processing.

If the output from the angular velocity sensor 125 is smaller than the predetermined value, the system control unit 115 detects, in step S1902, whether or not the position of the camera has changed in the vertical or horizontal direction from the previous scan based on the output from the angular velocity sensor 125. If the position of the camera has changed in the vertical or horizontal direction, the system control unit 115 determines that the scene has changed, sets the scene change flag to TRUE in step S1910, and ends the processing.

If the position of the camera has not changed in the vertical or horizontal direction from the previous scan, the system control unit 115 determines, in step S1903, whether or not the luminance of subjects has changed by a predetermined value or more from the previous scan based on the output from the AE processing unit 103. If the luminance of subjects has changed by the predetermined value or more, the system control unit 115 determines that the scene has changed, sets the scene change flag to TRUE in step S1910, and ends the processing.

If the luminance of subjects has not changed by the predetermined value or more from the previous scan, the system control unit 115 determines, in step S1904, whether or not a subject exists whose detection state has changed from the previous execution of scan based on the output from the subject detection unit 123. For example, if the system control unit 115 determines that the subject that was detected in the previously-scanned scene is no longer detected, or the subject that was not detected in the previously-scanned scene is detected, it determines that the scene has changed. Then, the system control unit 115 sets the scene change flag to TRUE in step S1910, and ends the processing.

If a subject does not exist whose detection state has changed from the previous execution of scan, the system control unit 115 proceeds to step S1905. In step S1905, the system control unit 115 determines whether or not the focus lens 104 has moved by a predetermined amount or more from the peak position that was obtained in the previous scan as a result of having a subject continuously focused through continuous AF in step S205. If the position of the focus lens 104 has changed by the predetermined amount or more, the system control unit 115 determines that the scene has changed, sets the scene change flag to TRUE in step S1910, and ends the processing. If the position of the focus lens 104 has not changed by the predetermined amount or more, the system control unit 115 proceeds to step S1906.

In step S1906, the system control unit 115 determines whether or not the subject detection unit 123 has detected a subject area. If the subject area has not been detected, the system control unit 115 determines that the scene has not changed, sets the scene change flag to FALSE in step S1909, and ends the processing. If the subject area has been detected, the system control unit 115 determines, in step S1907, whether or not the position of the detected subject area has changed by a predetermined amount or more from the previous scan. If the subject area has moved by the predetermined amount or more, the system control unit 115 determines that the scene has changed, sets the scene change flag to TRUE in step S1910, and ends the processing; otherwise, it determines that the scene has not changed, sets the scene change flag to FALSE in step S1909, and ends the processing.

<Previous Reference Determination>

Figure 20:
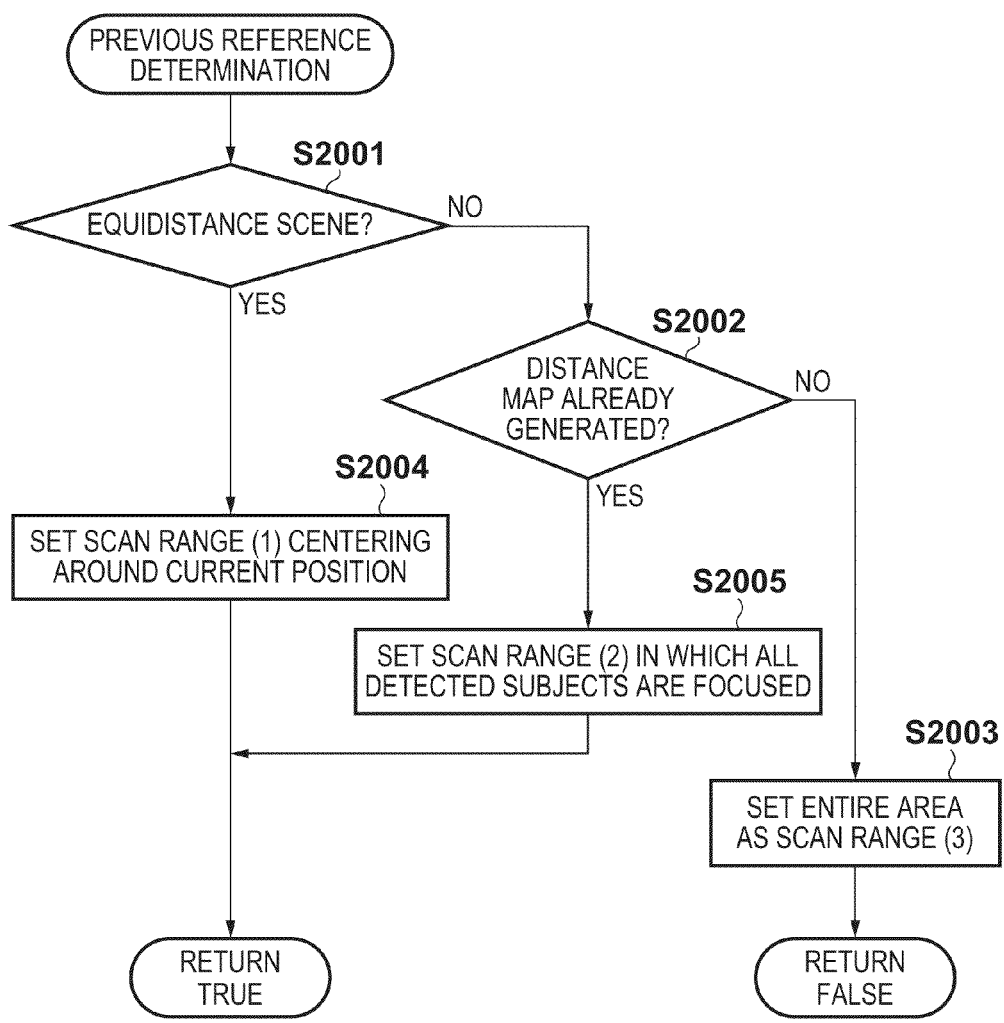
FIG. 20 is a flowchart of an operation for previous reference determination according to the embodiment.

FIG. 20 is a flowchart of an operation for the previous reference determination in step S302 of FIG. 3.

In step S2001, the system control unit 115 proceeds to step S2004 if the captured scene was determined as an equidistance scene as a result of the above-described equidistance determination in step S305, and to step S2002 if the captured scene was not determined as the equidistance scene.

In step S2002, the system control unit 115 determines whether or not the distance map has been generated; it proceeds to step S2005 if the distance map has been generated, and to step S2003 if the distance map has not been generated. It should be noted that the distance map is generated if a plurality of peaks have been acquired in step S1404 of FIG. 14; therefore, if not a single peak has been acquired, it is determined that the distance map has not been generated.

In step S2005, the system control unit 115 sets a range (2) including the detected subjects, that is to say, peaks. In step S2003, the entire area (3) is set as a scan range. In step S2004, as the subjects in the screen were determined to be substantially equidistant in step S2001, the system control unit 115 sets a range (1) smaller than the range (2), centering around the current position of the focus lens.

If the system control unit 115 has set the scan range (1) or (2) (step S2004 or S2005), it sets the result of the previous reference determination to TRUE, that is to say, it determines that there is no change or little change in the scene. On the other hand, if it has set the entire area as the scan range (3) (step S2003), it sets the result of the previous reference determination to FALSE, that is to say, it determines that the change in the scene is large and therefore the distance map needs to be generated.

As described above, according to the present embodiment, if it has been determined that the scene has changed, distance information of subjects is re-acquired, and therefore the accuracy of the distance information of the subjects, as well as the accuracy of image capture processing and image processing utilizing the distance information, can be improved. Furthermore, as the range of AF scan is changed in accordance with the distance ranges of subjects included in the captured scene, a focus detection operation can be executed at high speed.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-281753, filed on Dec. 25, 2012, which is hereby incorporated by reference herein its entirety.

What is claimed is:

1. An image capture apparatus comprising:
a focus detection unit that detects a plurality of focus evaluation values by moving a focus lens within a driving range, the plurality of focus evaluation values indicating in-focus positions of a plurality of focus detection areas;
a distance computation unit that computes subject distances of a plurality of subject areas included in a captured image based on the plurality of focus evaluation values; and
a change detection unit that detects whether or not the captured image has changed,
wherein when the change detection unit has detected a change in the captured image, the distance computation unit re-computes the subject distances of the plurality of subject areas by re-moving the focus lens,
the driving range of the focus lens for re-computing the subject distances of the plurality of subject areas is determined in accordance with distribution of previously-computed subject distances of the plurality of subject areas, and
the driving range of the focus lens for re-computing the subject distances of the plurality of subject areas includes in-focus positions corresponding to the previously-computed subject distances of the plurality of subject areas.

2. The image capture apparatus according to claim 1, wherein when re-computing the subject distances, the driving range of the focus lens is set to be smaller in a case where a difference among the subject distances of the plurality of subject areas is smaller than a first threshold than in a case where the difference among the subject distances of the plurality of subject areas is larger than a second threshold that is equal to or greater than the first threshold.

3. The image capture apparatus according to claim 1, wherein the driving range of the focus lens is set to be smaller in a case where the subject areas have been detected than in a case where the subject areas have not been detected.

4. The image capture apparatus according to claim 1, further comprising
a control unit that detects, from the captured image, subject areas with different subject distances in accordance with the subject distances of the plurality of subject areas, and applies image processing based on the subject distances to the subject areas.

5. An image capture apparatus comprising:
a focus detection unit that detects a plurality of focus evaluation values by moving a focus lens within a driving range, the plurality of focus evaluation values indicating in-focus positions of a plurality of focus detection areas;
a distance computation unit that computes subject distances of a plurality of subject areas included in a captured image based on the plurality of focus evaluation values; and
a change detection unit that detects whether or not the captured image has changed,
wherein when the change detection unit has detected a change in the captured image after moving the focus lens to compute the subject distances for the first time, the distance computation unit re-computes the subject distances of the plurality of subject areas by re-moving the focus lens,
when the subject distances of the plurality of subject areas computed for the first time fall within a part of a range from a near end to a far end, the driving range of the focus lens for re-computing the subject distances of the plurality of subject areas is set to be smaller than the driving range of the focus lens used when computing the subject distances of the plurality of subject areas for the first time, and
the driving range of the focus lens for re-computing the subject distances of the plurality of subject areas includes in-focus positions corresponding to the subject distances of the plurality of subject areas computed for the first time.

6. A control method for an image capture apparatus comprising:
a focus detection step of detecting a plurality of focus evaluation values by moving a focus lens within a driving range, the plurality of focus evaluation values indicating in-focus positions of a plurality of focus detection areas;

a distance computation step of computing subject distances of a plurality of subject areas included in a captured image based on the plurality of focus evaluation values; and a change detection step of detecting whether or not the captured image has changed, wherein when a change in the captured image has been detected in the change detection step, the distance computation step re-computes the subject distances of the plurality of subject areas by re-moving the focus lens, the driving range of the focus lens for re-computing the subject distances of the plurality of subject areas is determined in accordance with distribution of previously-computed subject distances of the plurality of subject areas, and the driving range of the focus lens for re-computing the subject distances of the plurality of subject areas includes in-focus positions corresponding to the previously-computed subject distances of the plurality of subject areas.

7. A control method for an image capture apparatus comprising:
- a focus detection step of detecting a plurality of focus evaluation values by moving a focus lens within a driving range, the plurality of focus evaluation values indicating in-focus positions of a plurality of focus detection areas;
- a distance computation step of computing subject distances of a plurality of subject areas included in a captured image based on the plurality of focus evaluation values; and
- a change detection step of detecting whether or not the captured image has changed, wherein when a change in the captured image has been detected in the change detection step after moving the focus lens to compute the subject distances for the first time, the distance computation step re-computes the subject distances of the plurality of subject areas by re-moving the focus lens, when the subject distances of the plurality of subject areas computed for the first time fall within a part of a range from a near end to a far end, the driving range of the focus lens for re-computing the subject distances of the plurality of subject areas is set to be smaller than the driving range of the focus lens used when computing the subject distances of the plurality of subject areas for the first time, and the driving range of the focus lens for re-computing the subject distances of the plurality of subject areas includes in-focus positions corresponding to the subject distances of the plurality of subject areas computed for the first time.

8. A non-transitory computer-readable recording medium storing therein a program for causing a computer provided in an image capture apparatus to execute the control method for the image capture apparatus according to claim 6.

9. A non-transitory computer-readable recording medium storing therein a program for causing a computer provided in an image capture apparatus to execute the control method for the image capture apparatus according to claim 7.

* * * * *